(12) United States Patent
Pereira et al.

(10) Patent No.: US 8,474,681 B1
(45) Date of Patent: Jul. 2, 2013

(54) SOLDER APPARATUS

(75) Inventors: John Pereira, Rehoboth, MA (US);
John P. Hendrick, West Kingston, RI (US); Lawrence Richard Cole, Marysville, OH (US)

(73) Assignee: Antaya Technologies Corp., Cranston, RI (US)

( * ) Notice: Subject to any disclaimer, the term of this patent is extended or adjusted under 35 U.S.C. 154(b) by 0 days.

(21) Appl. No.: 13/409,347

(22) Filed: Mar. 1, 2012

(51) Int. Cl.
*B23K 1/00* (2006.01)

(52) U.S. Cl.
USPC .................................. 228/14; 228/13; 228/41

(58) Field of Classification Search
USPC ............................................... 228/41, 13, 14
See application file for complete search history.

(56) References Cited

U.S. PATENT DOCUMENTS

| | | | |
|---|---|---|---|
| 3,943,685 A | 3/1976 | Rayburn | |
| 4,087,906 A | 5/1978 | Cobaugh et al. | |
| 4,162,572 A | 7/1979 | Rozmus | |
| 4,534,502 A | 8/1985 | Piurek | |
| 4,663,815 A | 5/1987 | Hartman et al. | |
| 4,667,402 A * | 5/1987 | Wilde | 29/840 |
| 4,844,324 A | 7/1989 | Todd | |
| 5,573,170 A * | 11/1996 | Sasaki et al. | 228/14 |
| 5,735,452 A * | 4/1998 | Yu et al. | 228/254 |
| 2005/0242161 A1* | 11/2005 | Shi | 228/180.21 |
| 2007/0071583 A1 | 3/2007 | Ong | |

OTHER PUBLICATIONS

G-KAI Machine Automatic, Terminals Soldering Machine, URL: http://www.automatic-machines.com/terminals-assembling-machine/terminals-soldering-machine.html, downloaded Jun. 30, 2011.
UTA Auto Industrial Co., Ltd., Strip Terminal Assembly Machine (AN) http://www.alibaba.com/product-free/239267346/Strip_Terminal_Assembly_Machine_AN_.html, downloaded Jun. 30, 2011.

\* cited by examiner

*Primary Examiner* — Nicholas P D'Aniello
(74) *Attorney, Agent, or Firm* — Hamilton, Brook, Smith & Reynolds, P.C.

(57) ABSTRACT

An apparatus for presoldering electrical components can include a die device having a punch member for punching a solder preform from a sheet of solder, and pressing the solder preform against an electrical component. A heating device can press against the electrical component on a opposite side from the die device for sandwiching the electrical component between the punch member and the heating member, for heating the electrical component and melting the solder preform thereon.

7 Claims, 17 Drawing Sheets

SOLDER APPARATUS

BACKGROUND

A common method of forming presoldered electrical terminals is to stamp the electrical terminals from a continuous ribbon of metal, such as copper, that is preclad with a layer of solder. Although presoldered electrical terminals can be quickly made in such a manner, the scrap metal left over after the terminals are removed, can consist of a perforated solder coated copper ribbon. Such mixed metal scrap is not easily recycled.

SUMMARY

The present invention can provide an apparatus and method that can form presoldered electrical terminals or components, in which solder can be applied onto electrical terminals or components after these electrical terminals or components are formed, and can eliminate mixed metal scrap.

The present invention can provide an apparatus for presoldering electrical components and can include a die device having a punch member for punching a solder preform from a sheet of solder, and then pressing the solder preform against an electrical component. A heating device can press against the electrical component on an opposite side from the die device for sandwiching the electrical component between the punch member and the heating member, for heating the electrical component and melting the solder preform thereon.

In particular embodiments, the die device can include a die member having a cavity over which the sheet of solder is extendable, through which the punch member enters for punching the solder preform. The punch member can extend to a location partway within the cavity of the die member for forming a mold with a mold cavity for positioning against the electrical component for preventing molten solder from escaping. The mold cavity can be shaped and sized for forming a solder layer on the electrical component having a predetermined thickness and a flat nonmeniscus outer surface.

The die device can include longitudinally positioned multiple punch locations having multiple punch members extendable within multiple respective cavities in the die member over which a ribbon of solder is extendable, for punching multiple solder preforms from the ribbon of solder and pressing the multiple solder preforms against respective multiple electrical components. Each punch member can be extendable to a location partway within a respective cavity in the die member, for forming a respective mold with a mold cavity for positioning against a respective electrical component for preventing molten solder from escaping. Each mold cavity can be shaped and sized for forming a solder layer on a respective electrical component having a predetermined thickness and a flat nonmeniscus outer surface, and removable after solder solidification. A series of electrical components can be attached to a carrier strip in a spaced apart fashion, and positioned longitudinally. A heating device can include longitudinally positioned multiple spaced apart heating members for pressing against multiple electrical components and sandwiching the multiple electrical components between respective multiple punch members and heating members for simultaneously heating the electrical components and melting the solder preforms thereon. Each heating member can include a heating element for individually heating the heating member, and a clamping surface sized for pressing only against a respective electrical component. Each heating member can provide heat for melting a bottom layer of a respective solder preform for soldering to a respective electrical component. The heating members can each be connected to a respective actuator for individually simultaneously pressing the heating members against the respective electrical components. The punch members and cavities within the die member can be formed with a nonstick surface. The ribbon of solder and the carrier strip having the series of electrical components can be indexed together in unison, with the ribbon of solder being positioned above the carrier strip. A reciprocating indexer can simultaneously index the ribbon of solder and the carrier strip together, the indexer can have a clamping device for clamping the solder ribbon, and indexing pins for engaging mating holes in the carrier strip.

The present invention can also provide an apparatus for presoldering electrical components and can include a mold member having a mold with a mold cavity for molding the solder layer on the electrical component. A heating device can press against the electrical component on an opposite side from the mold member for sandwiching the electrical component between the mold member and the heating device for heating the electrical component and molding the solder layer thereon. The mold and the mold cavity can be positioned against the electrical component for preventing molten solder from escaping, and forming the solder layer on the electrical component with a predetermined thickness and a flat nonmeniscus outer surface, and being removable after the solder layer solidifies.

In particular embodiments, the mold member can include longitudinally positioned multiple molds with mold cavities for molding multiple solder layers on respective multiple electrical components. The heating device can include longitudinally positioned multiple spaced apart heating members for pressing against respective electrical components and sandwiching the multiple electrical components between the respective multiple molds and heating members for simultaneously heating the electrical components and molding the solder layers thereon. Each heating member can include a heating element for individually heating the heating member, and a clamping surface sized for pressing only against a respective electrical component. The heating members can each be connected to a respective actuator for individually simultaneously pressing the heating members against the respective electrical components.

The present invention can provide a method of presoldering electrical components including punching a solder preform from a sheet of solder, and pressing the solder preform against an electrical component with a punch member of a die device. A heating device can be pressed against an electrical component on an opposite side from the die device for sandwiching the electrical component between the punch member and the heating device, for heating the electrical component and melting the solder preform thereon.

In particular embodiments, the die device can include a die member having a cavity over which the sheet of solder is extended, through which the punch member can enter for punching the solder preform. The punch member can extend to a location partway within the cavity of the die member for forming a mold with a mold cavity for positioning against the electrical component for preventing molten solder from escaping. The mold cavity can be provided with a shape and size for forming a solder layer on the electrical component having a predetermined thickness and a flat nonmeniscus outer surface.

The die device can include longitudinally positioned multiple punch locations having multiple punch members extendable within multiple respective cavities in the die member over which a ribbon of solder is extended. Multiple solder preforms can be punched from the ribbon of solder and pressed against respective multiple electrical components by extending the multiple punch members within the multiple respective cavities within the die member. Each punch member can extend to a location partway within a respective cavity in the die member, for forming a respective mold with a mold cavity against a respective electrical component for preventing molten solder from escaping. Each mold cavity can be provided with a shape and size for forming a solder layer on a respective electrical component having a predetermined thickness and a flat nonmeniscus outer surface, and can be removed after solder solidification. A series of electrical components can be attached to a carrier strip in a spaced apart fashion, and positioned longitudinally. The heating device can include longitudinally positioned multiple spaced apart heating members. The multiple heating members can press against respective multiple electrical components and sandwich the multiple electrical components between respective multiple punch members and heating members for simultaneously heating the electrical components and melting the solder preforms thereon. Each heating member can be individually heated with a respective heating element. A clamping surface can be provided for pressing only against a respective electrical component. Each heating member can be provided with heat for melting a bottom layer of a respective solder preform for soldering to a respective electrical component. The heating members can individually simultaneously press against the respective electrical components with a respective actuator connected to each heating member. The punch members and cavities within the die members can be provided with a nonstick surface. The ribbon of solder and the carrier strip having the series of electrical components, can be indexed together in unison, with the ribbon of solder being positioned above the carrier strip. The ribbon of solder and the carrier strip can be simultaneously indexed together with a reciprocating indexer. The indexer can have a clamping device for clamping the solder ribbon, and indexing pins for engaging mating holes in the carrier strip.

The present invention can provide a method of presoldering electrical components including molding a solder layer on an electrical component with a mold member having a mold with a mold cavity. A heating device can press against the electrical component on an opposite side from the mold member for sandwiching the electrical component between the mold member and the heating device for heating the electrical component and molding the solder layer thereon. The mold and the mold cavity can be positioned against the electrical component for preventing molten solder from escaping, and forming the solder layer on the electrical component with a predetermined thickness and a flat nonmeniscus outer surface. The mold can be removed after the solder layer solidifies.

In particular embodiments, the mold member can include longitudinally positioned multiple molds with mold cavities and the heating device can include longitudinally positioned multiple spaced apart heating members. Multiple solder layers can be molded on respective multiple electrical components with the multiple molds while pressing the multiple heating members against the respective electrical components and sandwiching the multiple electrical components between the respective multiple molds and heating members for simultaneously heating the electrical components and molding the solder layers thereon. Each heating member can be individually heated with a respective heating element. A clamping surface can be provided for pressing only against a respective electrical component. The heating members can be individually simultaneously pressed against the respective electrical components with a respective actuator connected to each heating member.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
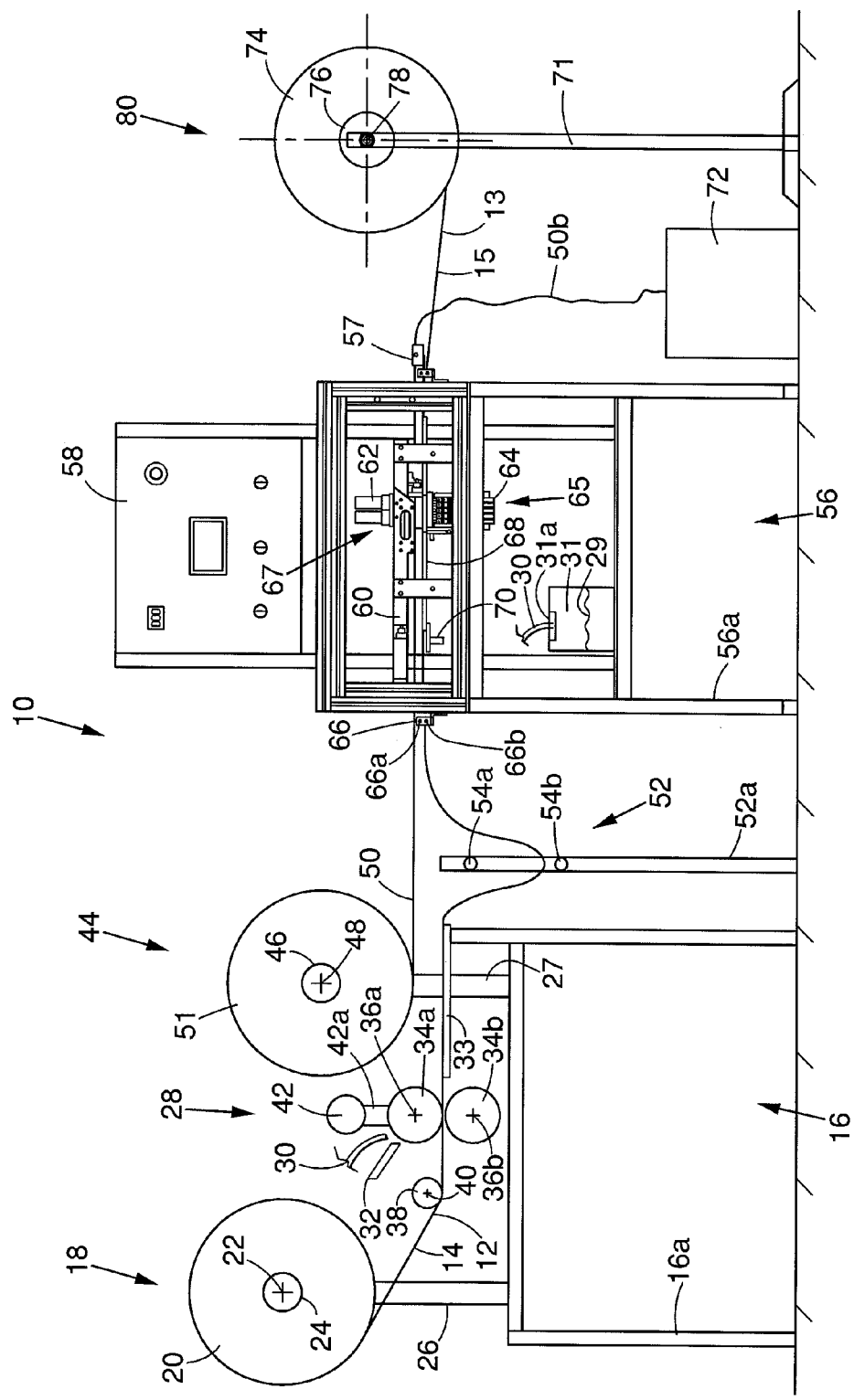
FIG. 1 is a side view of an embodiment of an apparatus for presoldering electrical components in the present invention.
Figure 2:
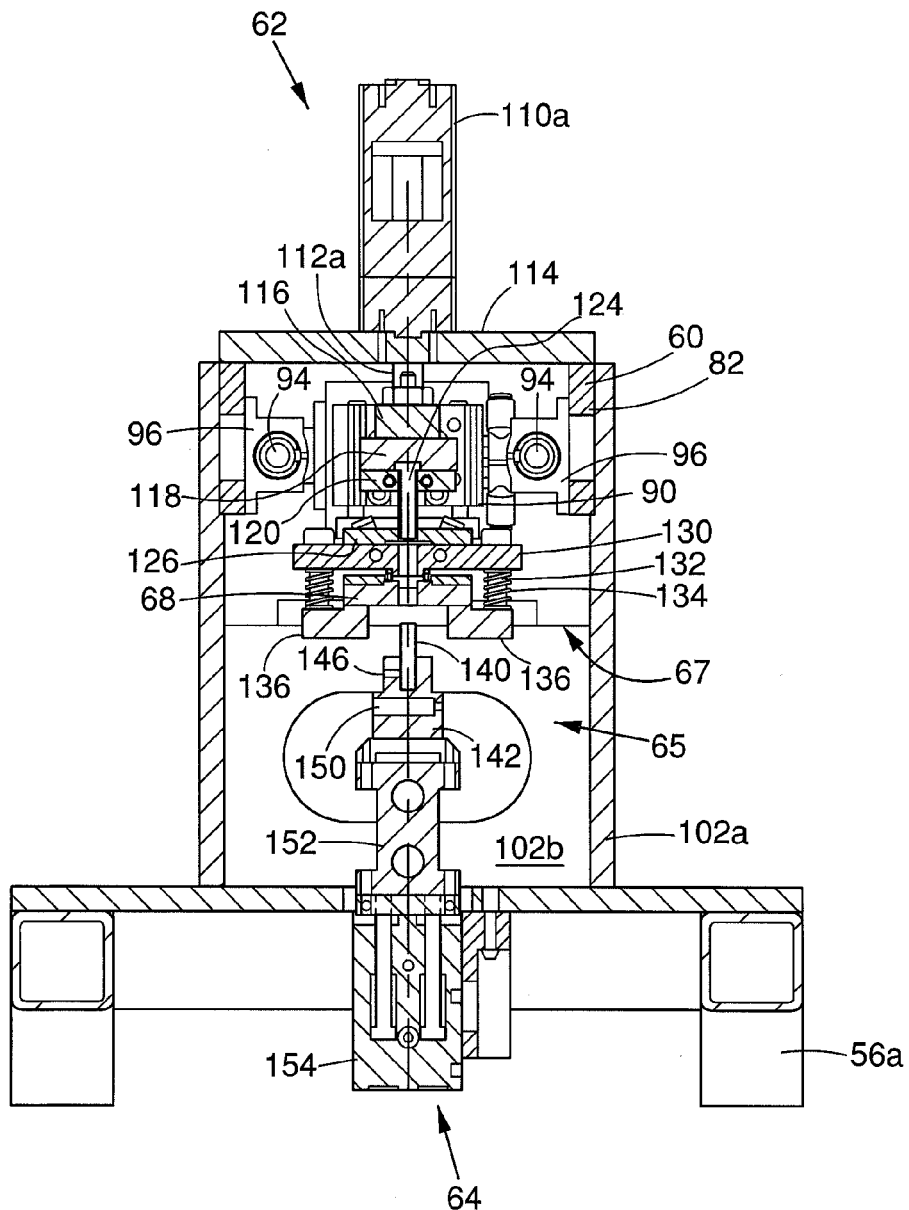
FIG. 2 is a cross sectional view through a portion of the apparatus of FIG. 1 showing portions of an embodiment of an indexing device, a die device and a heating device.
Figure 3:
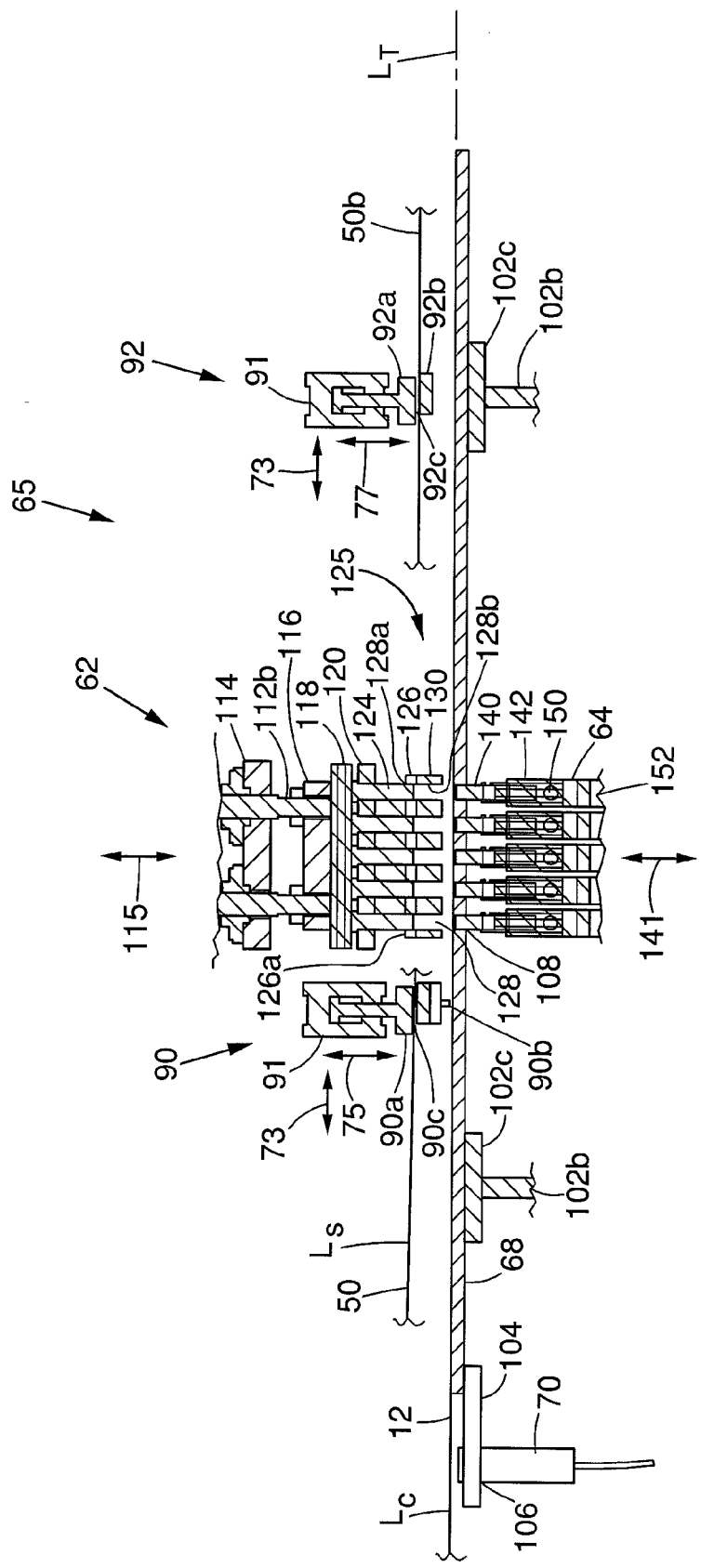
FIG. 3 is a schematic side sectional view of a portion of the apparatus of FIG. 1, showing portions of the indexing device, die device and heating device.
Figure 4:
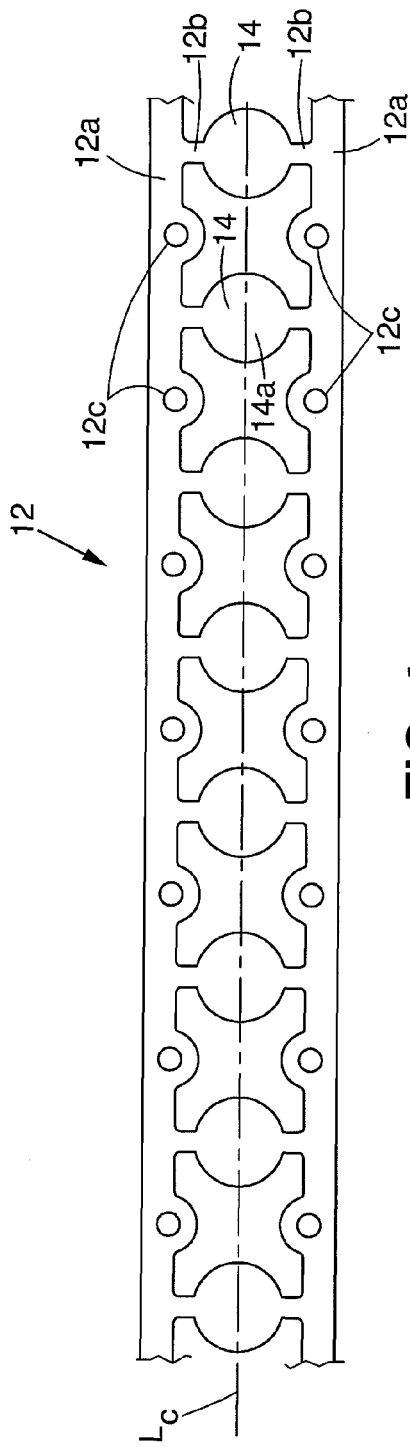
FIG. 4 is a plan view of one embodiment of a carrier strip containing electrical components prior to presoldering.
Figure 5:
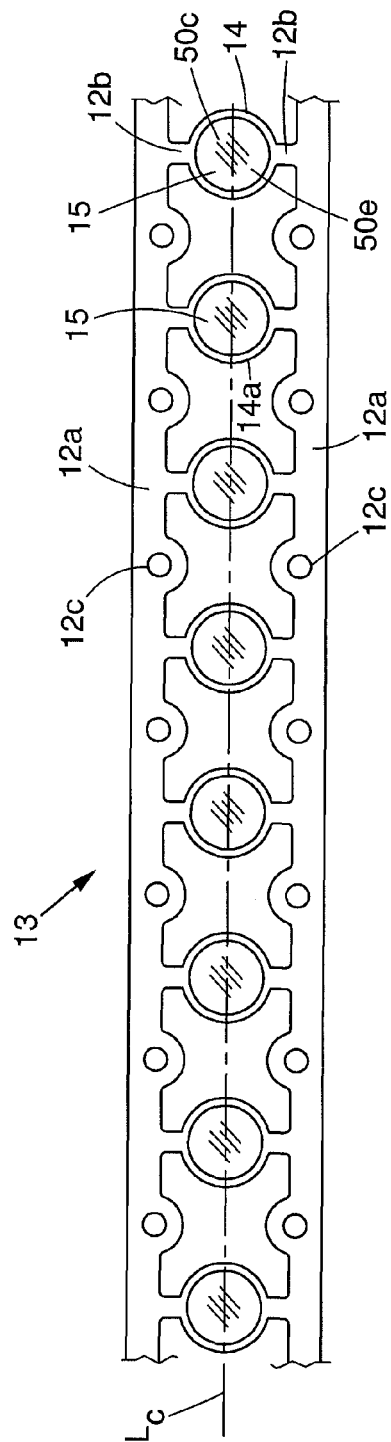
FIG. 5 is a plan view of the carrier strip of FIG. 4 with layers of solder presoldered on the electrical components.

Referring to FIGS. 1-3, solder or soldering apparatus, system or machine 10 can process a carrier strip or ribbon 12 (FIG. 4) that has a series of electrical terminals or components 14 positioned in an equally spaced apart manner along a longitudinal carrier axis $L_C$. Each electrical component 14 can be connected between two or a pair of longitudinally extending side or edge strips 12a by two or a pair of connecting members 12b extending laterally from opposite sides of the electrical component 14. Each side strip 12a can include a series of equally spaced apart indexing holes 12c, which can be positioned midway between each electrical component 14. The solder apparatus 10 can position a quantity of solder, such as a solder piece, component or preform 50a on each electrical component 14, and melt the solder preforms 50a onto electrical components 14 to form a presoldered solder layer 50c onto each electrical component 14. This results in a processed carrier strip 13 (FIG. 5) having a series of presoldered electrical terminals or components 15 positioned along longitudinal carrier axis $L_C$. FIGS. 4 and 5 show one example of carrier strips 12 and 13, and it is understood that the shape and configuration of carrier strips 12, 13, electrical terminals or components 14, and solder layers 50c, can be different for various applications. The presoldered electrical terminals or components 15 can be finished electrical terminals or components, or can be further processed. Such further processing can include further forming of the components 15. In some embodiments, components 15 can be part of a two part electrical terminal, such as the base, and can be assembled with the second part in a later process.

Solder apparatus 10 can have an unwind station 16 with a carrier unwind 18 for unwinding the carrier strip 12 to be processed, from a carrier roll or spool 20. The spool 20 can be rotatably mounted about a horizontal carrier spool axis 22. The spool 20 can be mounted to a frame 16a by a bracket or support 26. The carrier strip 12 that is pulled from spool 20 can pass through a flux station 28 which can apply liquid flux 29 to the electrical components 14. The carrier strip 12 can bend or wrap around an idler wheel 38 that rotates about a horizontal axis 40, and pass between upper 34a and lower 34b applicator wheels. The applicator wheels 34a and 34b can rotate about respective horizontal axes 36a and 36b, and one or both wheels 34a and 34b can be connected to drive motor 42 by transmission 42a for driving wheels 34a and/or 34b. Flux 29 can be contained within a flux reservoir 31 and pumped through a hose, tube or conduit 30 with a pump 31a such as a peristaltic pump, to the upper applicator wheel 34a, where a spreading member 32, such as a spreading blade or brush, spreads the flux 29 on the wheel 34a. The flux 29 on the wheel 34a is transferred onto the electrical components 14 as the carrier strip 12 passes through wheels 34a and 34b. If desired, rotation of spool 20 can be aided by a drive motor 24 coupled thereto. The prefluxed carrier strip 12 can pass over a guide 33 and through a unwind speed control station 52 that is downstream from unwind station 16.

Unwind speed control station 52 can include upper and lower sensor or sensing members 54a and 54b, that are mounted to a frame, stand or pole 52a. The carrier strip 12 can pass between sensing members 54a and 54b. If the carrier strip 12 is being driven too slowly by motor 42, the carrier strip 12 will rise upwardly and activate upper sensor member 54a, and if the carrier strip 12 is driven too fast by motor 42, the carrier strip 12 will sag downwardly and activate lower sensor member 54b. The sensor members 54a, 54b and motor 42 are electrically connected to controller 58, and controller 58 will cause motor 42 to speed up if upper sensor member 54a is activated, and to slow down motor 42 if lower sensor member 54b is activated. The sensor members 54a/54b can consist of any suitable switch, including mechanical, proximity, or optical switches, and can include pivoting or linear translating idler rollers if desired. The unwind station 16 can also include a solder unwind 44 for unwinding a solder sheet ribbon, strip or tape 50 from a solder spool or roll 51. The solder spool 51 can rotate about a horizontal solder spool axis 48, and can be mounted to frame 16a by a bracket or support 27. The solder ribbon 50 can be pulled from the spool 51, or alternatively, spool 51 can include a drive motor 48 for driving spool 51, whereby unwind speed control station 52 can include another set of sensors 54a and 54b for controlling the unwind speed of solder ribbon 50.

Soldering station 56 can be positioned downstream from unwind station 16 and can have a frame 56a for supporting the flux reservoir 31, controller 58 and a soldering apparatus, assembly, arrangement or device 65. The soldering device 65 can include an indexing device, mechanism, arrangement or apparatus, or indexer 60, for indexing the carrier strip 12 and solder ribbon 50 into the soldering device 65, a solder die, press or mold apparatus, assembly, arrangement or device 67 that can form solder preforms 50a from the solder ribbon 50 and place or press the preforms 50a on the electrical components 14 of the carrier strip 12 and form the layers of solder 50c, and a heat, heater, heating, or melting apparatus, assembly, arrangement or device 64 which can melt the solder preforms 50a into the layers of solder 50c onto the electrical components 14.

Figure 6:
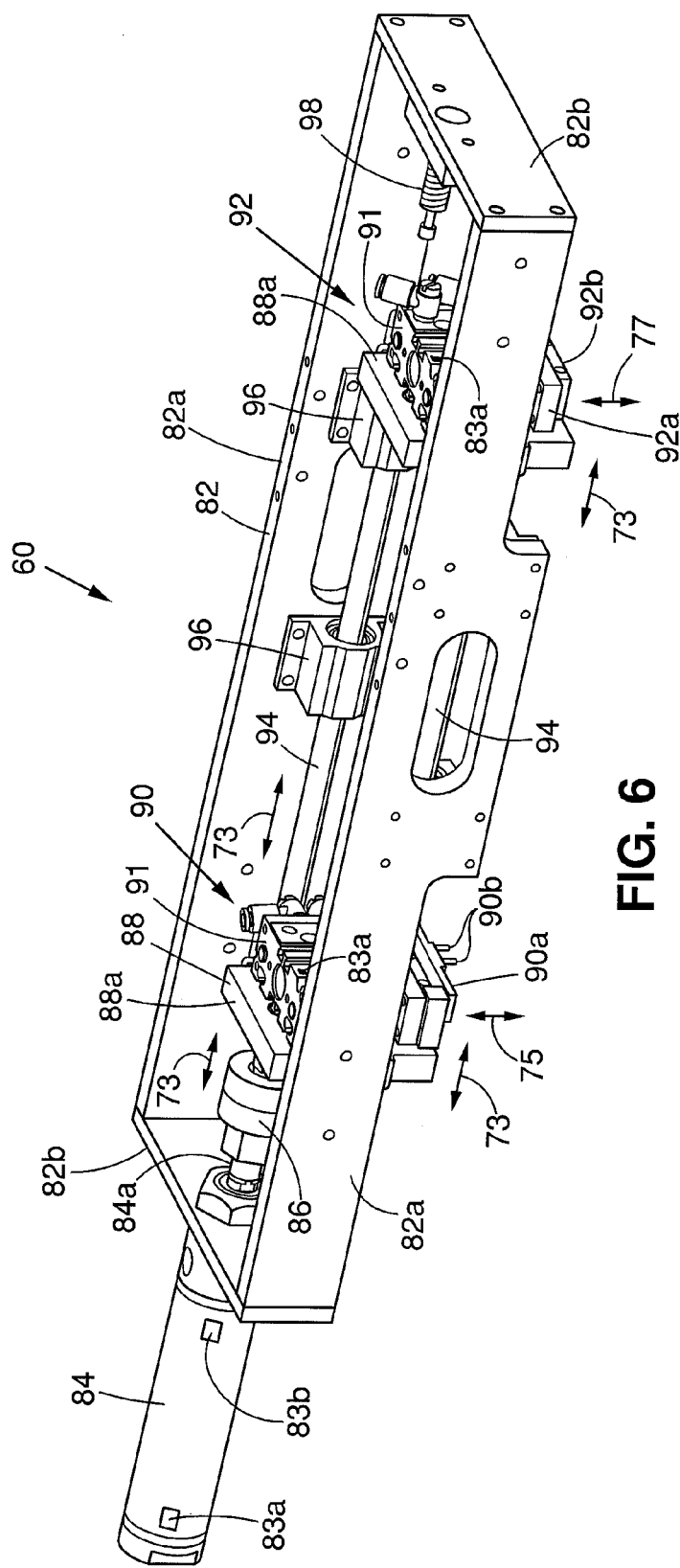
FIG. 6 is a perspective view of an embodiment of an indexing device.
Figure 11:
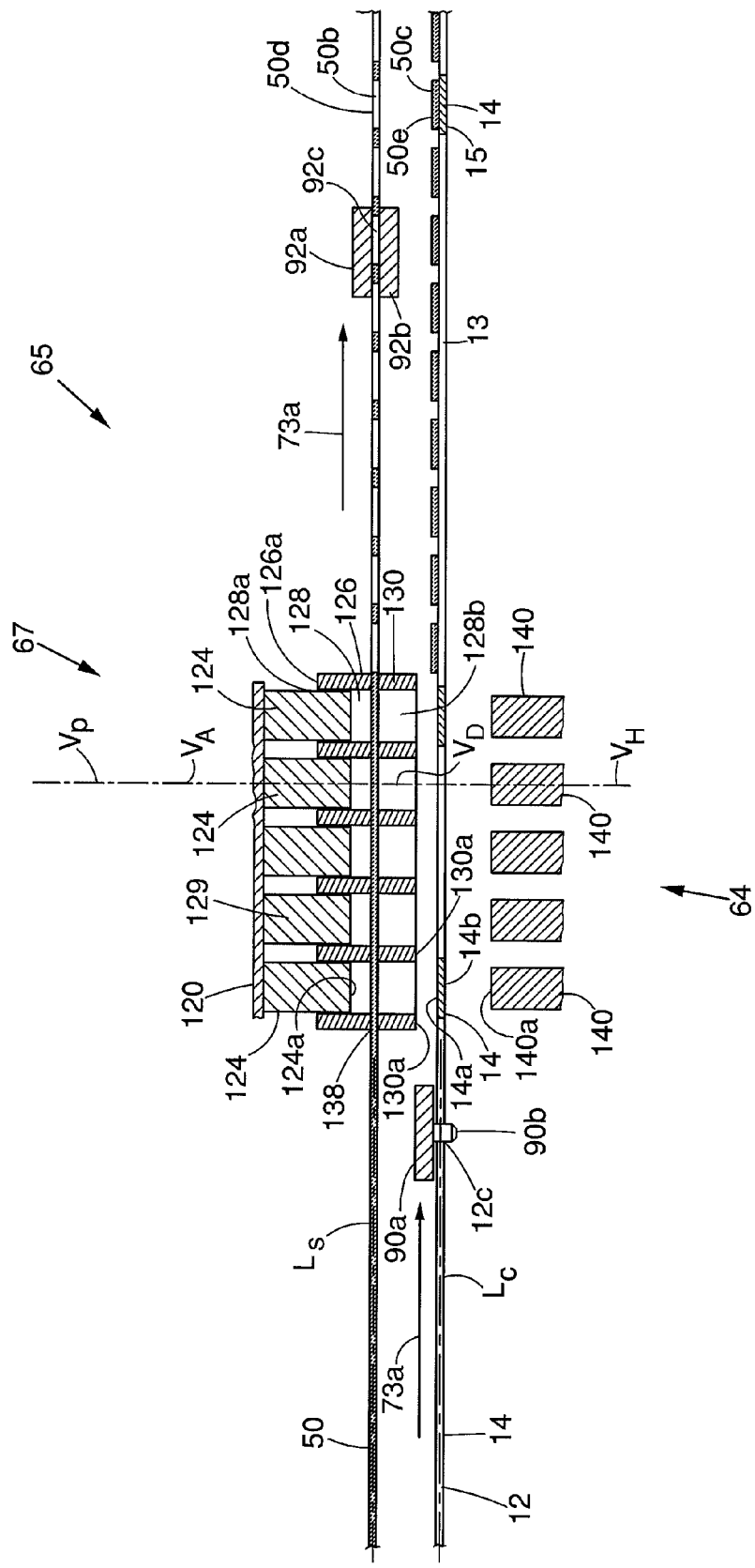
FIG. 11 is a schematic side sectional view of the die device and heating device positioned prior to solder application.

The solder ribbon 50 and the carrier strip 12 can enter the soldering station 56 through a guide 66, which can have upper 66a and lower rollers 66b, for positioning the solder ribbon 50 above the carrier strip 12 in alignment with each other, for example, so that the solder ribbon longitudinal axis $L_s$ is aligned with the carrier strip longitudinal axis $L_C$ (FIGS. 3 and 11). Referring to FIGS. 2 and 6, the indexer 60 can include a stationary frame 82 with longitudinal two side walls 82a and two lateral end walls 82b for supporting a carrier strip index or indexing mechanism, assembly or arrangement 90 for indexing the carrier strip 12, and a solder ribbon index or indexing mechanism, assembly or arrangement 92 for indexing the solder ribbon 50. The carrier strip index mechanism 90 can be upstream from the solder ribbon index mechanism 92, and each can be mounted to a mounting plate 88a of a reciprocating frame 88, which allows the carrier strip index mechanism 90 and the solder ribbon index mechanism 92 to be simultaneously reciprocated together horizontally in the longitudinal direction of solder ribbon 50 and carrier strip 12 and in the direction of arrows 73, to simultaneously index the solder ribbon 50 and the carrier strip 12 together in unison. The index mechanisms 90 and 92 can be mounted to the mounting plates 88a in locations that are on opposite sides of the die device 67, on the upstream and downstream sides, and the mounting plates 88a can be connected together by two longitudinal linear bearing slide rails or rods 94. The slide rails 94 can be mounted to opposing inner surfaces of the side walls 82a of frame 82 by linear bearing blocks 96, for example, two blocks 96 per rail 94. A reciprocating linear index actuator such as a fluid, gas or air cylinder 84 can be mounted to one end wall 82b of frame 82, for example, the upstream end, and the cylinder rod 84a can be coupled to the reciprocating frame 88 by a coupler 86, which can be connected to the upstream mounting plate 88a. The reciprocating frame 88 can be reciprocated horizontally in the longitudinal direction of the solder ribbon 50 and carrier strip 12 by the cylinder 84, in both downstream and upstream directions, for simultaneously indexing the index mechanisms 90 and 92 as seen by arrows 73. A threaded adjustable shock absorbing stop 98 can be mounted to the downstream end wall 82b of frame 82 for controlling the length or stroke of downstream travel of the index mechanisms 90 and 92 to stop at a desired location to precisely position the carrier strip 12 relative to die device 67 for alignment. In addition, the cylinder 84 can have first 83a and second 83b reed or limit switches which are electrically connected to controller 58 for notifying the controller 58 whether the cylinder 84 is in a retracted or extended position.

The carrier strip index mechanism 90 can include a reciprocating linear actuator such as a fluid, gas or air cylinder 91 mounted to upstream plate 88a for vertically raising and lowering a mount 90a in the direction of arrows 75. A pair of index or indexing pins 90b extend from mount 90a for engaging and disengaging from a pair of index holes 12c in carrier strip 12, to index carrier strip 12. The mount 90a can have slot 90c (FIG. 3) to allow the solder ribbon 50 to pass through the mount 90a above the carrier strip 12. The solder ribbon index mechanism 92 can also include a reciprocating linear actuator such as a fluid, gas or air cylinder 91 mounted to downstream plate 88a for vertically raising and lowering a movable clamping jaw 92a in the direction of arrows 77 against and away from an opposed stationary jaw 92b, for gripping and releasing the solder ribbon 50 in the gap 92c therebetween, for indexing the solder ribbon 50. The cylinders 91 can also have reed or limit switches 83a and 83b which are electrically connected to controller 58 for notifying the controller 58 whether cylinders 91 are in the retracted or extended positions. Indexer 60 allows the carrier strip 12 to be engaged by the pins 90b of index mechanism 90, at the same time that the solder ribbon 50 is gripped by the jaws 92a and 92b of index mechanism 92, and moved simultaneously together with movement of reciprocating frame 88 until hitting stop 98, for indexing the carrier strip 12 and the solder ribbon 50 to the exact same location and distance simultaneously with consistent accuracy. In other embodiments, the positions of index mechanisms 90 and 92 can be varied, or the mechanisms can be combined together. Alternatively, the carrier strip 12 and the solder ribbon 50 can also be indexed by rollers that are driven by stepper or servo motors.

Figure 7:
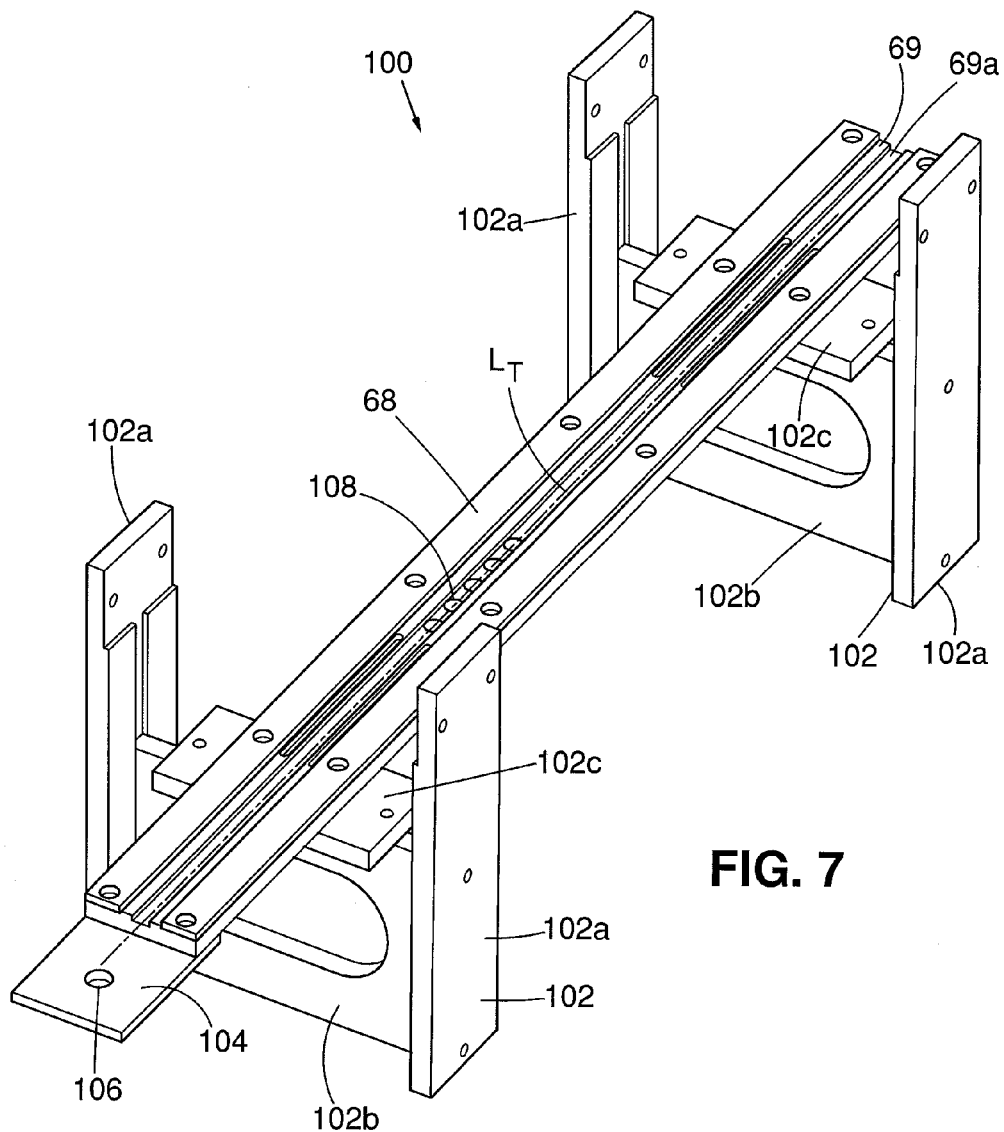
FIG. 7 is a perspective view of an embodiment of a guide, feed or support track assembly.

Referring to FIGS. 3 and 7, the carrier strip 12 moves from guide 66 (FIG. 1) to a guide, feed or support track 68 of a guide, feed or support track assembly 100. The carrier strip 12 can travel within the guide track 68 along a longitudinal track axis $L_T$ on recessed rails 69 which can be separated by a longitudinal slot 69a. A proximity sensor 70 can be electrically connected to controller 58 and mounted to the guide track 68 within a mounting hole 106 of a bracket 104 for sensing the presence or absence of a carrier strip 12. The guide track 68 can be supported by supports 102 which are mounted to frame 56a. In addition, the indexer 60 can be also mounted to supports 102. Each support 102 can be have two vertical legs 102a which are connected together by a lateral member 102b, which in turn supports a flat member 102c onto which the guide track 68 sits. A series of equally spaced apart holes or openings 108 (for example, five) can be positioned within the track 68 through slot 69a along longitudinal axis $L_T$ to allow heating members 140 (FIG. 10) to extend through or up into the guide track 68 to contact electrical components 14 on the carrier strip 12.

Figure 8:
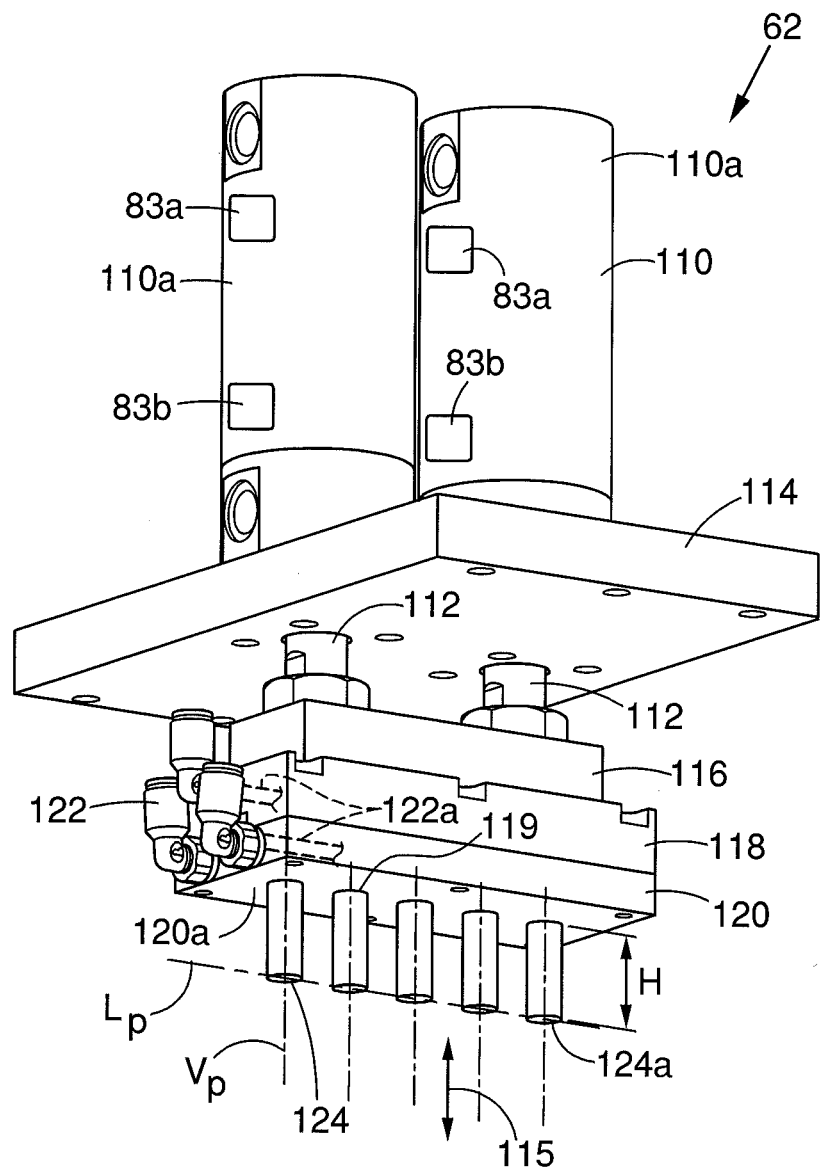
FIG. 8 is a perspective view of an embodiment of a solder feed or punch assembly of a die device.
Figure 9:
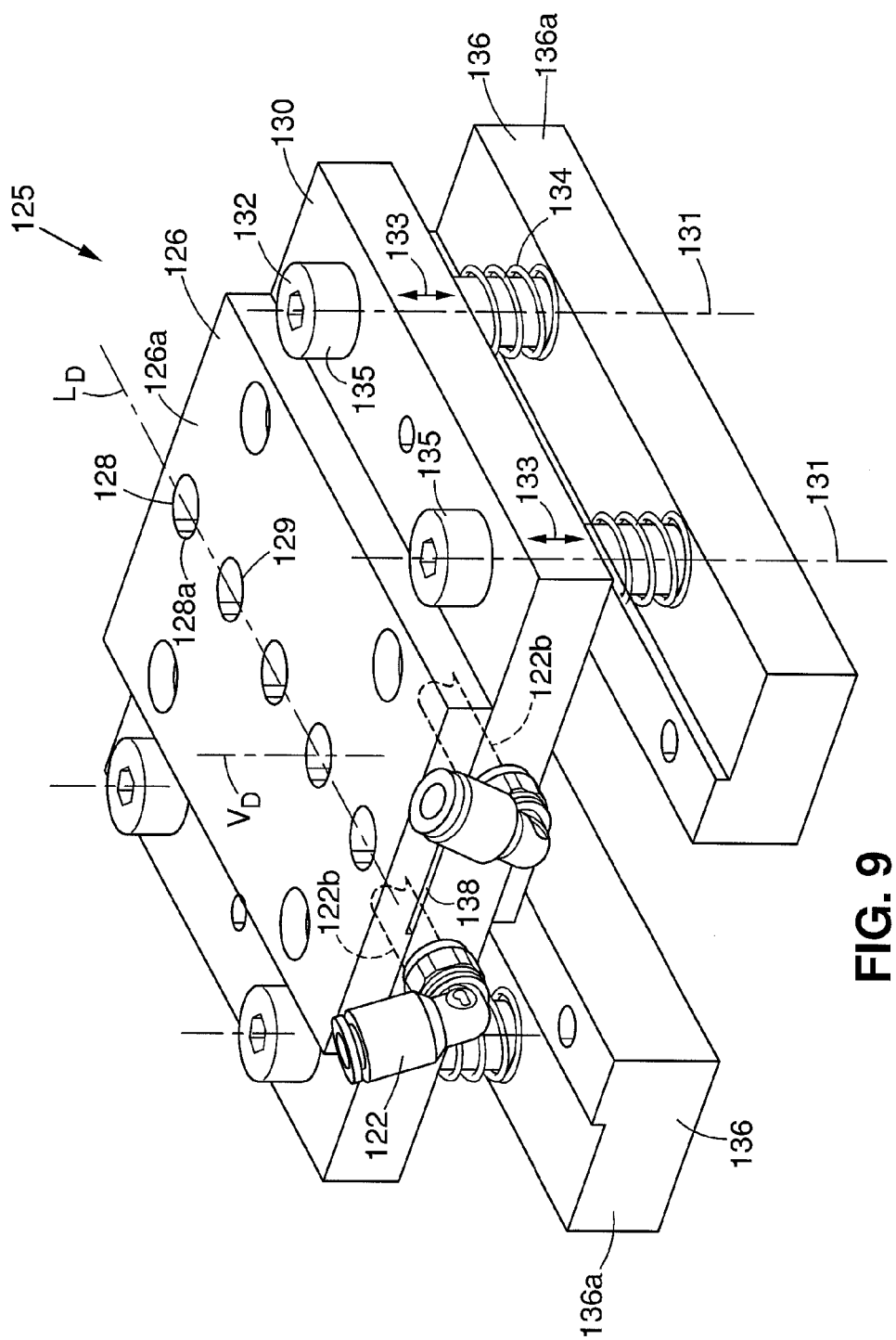
FIG. 9 is a perspective view of an embodiment of a die base assembly portion of the die device.

Referring to FIGS. 8 and 9, die device 67 can include a feed, press or punch arrangement, device assembly or mechanism portion 62 and a die base assembly portion 125. The punch assembly 62 can include one or more protruding movable press or punch protrusions, members or punches 124, for example, a series or row of five punch members 124 for simultaneously punching multiple solder preforms 50a (such as five) from the solder ribbon 50. The multiple punch members 124 can be mounted to a mounting plate or block 118, each along a vertical punch member axis $V_P$, and positioned in equally spaced apart fashion in alignment along a longitudinal horizontal punch member axis $L^P$. A spacer plate 120 can be mounted to mounting plate 118 and can have one or more multiple holes or openings 119 through which the punch members 124 can extend. The thickness of the spacer plate 120 can be sized to provide a particular controlled desired extension height H that the punch members 124 extend from the lower surface 120a of spacer plate 120, and which can act as a mechanical stop that results in a controlled depth of travel within the die base assembly portion 125. The punch members 124 can be moved or translated vertically up and down in the direction of arrows 115 by a linear actuator assembly 110, which can include one or more, for example two linear actuators, such as fluid, gas or air cylinders 110a, that are mounted to a cylinder mounting plate 114. The cylinder mounting plate 114 can be mounted to the side walls 82a of the frame 82 of the indexer 60, which mounts the punch assembly 62 to the indexer 60 and guide track 68. The cylinder rods 112 of each cylinder 110a can be attached or coupled to an adapter plate 116, which in turn can be attached or coupled to mounting plate 118. The use of two cylinders 110a positioned side by side with the cylinder rods 112 aligned to be near the ends of the row of punch members 124 can reduce deflection of the mounting plate 118 by applying equal force at two ends of the row, in comparison to using a single cylinder which applies force at only one location, and can provide more precise control of the punch members 124. One or two sets of reed or limit switches 83a and 83b can be on the cylinders 110a and electrically connected to the controller 58 for notifying the controller 58 whether the cylinder rods 112 are extended or refracted. A series of elbows 122 can be connected to tubing to convey exhaust air from the cylinders or pneumatic system, through cooling passages 122a in the mounting plate 118 and spacer plate 120 for cooling purposes, which can remove heat from the punch members 124.

The die base portion 125 can include an upper die guide plate or member 126 that is mounted to a lower die plate or member 130, such as by screws or bolts. A longitudinal guide opening, space or track 138 can be formed between the upper 126 and lower 130 plates for guiding the moving or indexing solder ribbon 50 over the lower plate 130, and can be a groove or channel in the upper plate 126 aligned with the longitudinal axis $L_s$ of solder ribbon 50 and sized for guiding the solder ribbon 50. The lower die plate 130 can be movably mounted by a series of spring loaded post members 135 to a base 136 which can have two spaced apart base members 136a. The spring loaded posts 135 can consist of four posts 132 such as shoulder screws, positioned through the lower plate 130 near the corners along vertical axes 131 and secured to the base members 136a. A compression spring member 134 such as a helical compression spring can be positioned concentrically or coaxially around the posts 132 and sandwiched between the lower plate 130 and the base members 136a, which allows the lower plate 130 to be pressed downwardly to move resiliently downward against the force of the spring members 134, and to be biased by the spring members 134 when such pressure is removed for upward movement, in the direction of arrows 133. One or more, or multiple, such as five, die cavities, openings or holes 128, can extend through the upper 126 and lower 130 die plates along vertical axes $V_D$. The die cavities 128 can be arranged in an equally spaced apart fashion along a longitudinal horizontal die member axis $L_D$ in an aligned manner that matches and is engageable with the punch members 124 that are positioned along longitudinal axis $L_P$, thereby forming multiple punch locations 129, that are aligned with track 138 and solder ribbon 50. The die cavities 128 can have an upper die cavity guide portion 128a extending through the upper plate 126, and a lower die cavity portion 128b extending through the lower plate 130.

The multiple upper die cavity guide portions 128a can simultaneously accept, contain, align and guide the multiple punch members 124 while moving in the direction of arrows 115 downwardly into the lower die cavity portions 128b for simultaneously punching multiple equally spaced apart solder preforms 50a from the solder ribbon 50 extending over the lower plate 130 and the lower die cavity portions 128b. The bottom or lower surface 120a of the spacer plate 120 limits the amount depth, or distance that the punch members 124 can extend into the die cavities 128, to the distance or height H extending from the spacer plate 120, by engaging or resting against the top surface 126a of the upper plate 126, acting as a mechanical stop. Further downward movement of the punch members 124 then pushes and moves the die plates 126 and 130 downwardly in the direction of arrows 133 against the resilient force of spring members 134 to rest upon or engage the carrier strip 12. Depending upon the thickness of the solder ribbon 50 and the spring force of the spring members 134, the punch members 124 can either 1) punch solder preforms 50a from solder ribbon 50 before pushing the die plates 126 and 130 downwardly, 2) can punch the solder preforms 50 after the die plates 126 and 130 have been pushed downwardly, or 3) can punch the preforms 50a at the same time that the die plates 126 and 130 are moving downwardly. The punch members 124 and the die plates 126 and 130 can be formed of hardened steel. The punch members 124 and die cavities 128 are shown to be round, which corresponds to the round electrical components 14 shown in FIG. 4, for forming round solder preforms 50a which in turn form round layers of solder 50c. It is understood that the punch members 124 and die cavities 128 can have other shapes for corresponding to electrical components having different shapes. Elbows 122 can be connected to tubing to provide coolant such as air exhausted from the air cylinders or from the pneumatic system, through cooling passages 122b in the die plate 130 for removing heat from the die plate 130 for cooling purposes.

Figure 10:
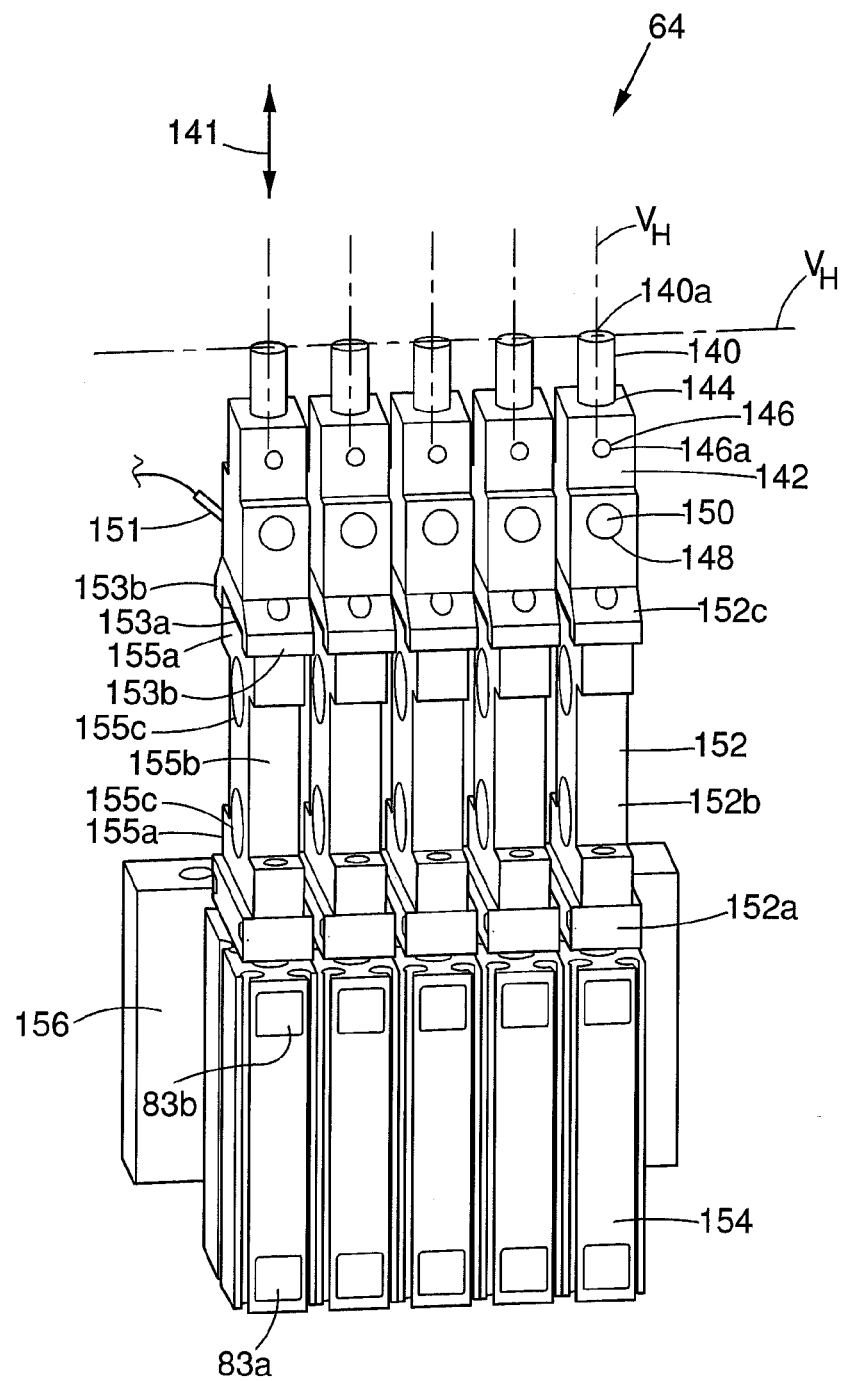
FIG. 10 is a perspective view of an embodiment of a heating device.

Referring to FIG. 10, heating device 64 can include one or more, or multiple movable heated or heating protrusions or members 140, such as five, each extending along a vertical heating member axis $V_H$ and positioned side by side in an equally spaced apart manner along longitudinal horizontal heating member axis $L_H$ for alignment with punch members 124 and die cavities 128 along axes $V_P$, $L_P$, $V_D$ and $L_D$. Each heating member 140 can extend from a respective individual heated or heating base or block 142, which can be heated by a respective heating element or cartridge 150 inserted into a hole 148 in the heating block 142. Each heating member 140 can be formed integrally with a respective block 142, or can be inserted into a hole 144 in the block 142, and secured or locked in place by a set screw 146 within a lateral threaded hole 146a, from the side. Each heating element 150 can be laterally positioned within a block 142 at a right angle to heating member 140. In some embodiments, the heating element 150 can be oriented within block 142 in other suitable orientations or positions. A thermocouple 151 can be attached to or inserted into each block 142, for example, on the opposite side from the heating element 150, for determining the temperature of the heating element 150 or the block 142. The blocks 142 and the heating members 140 can be made of a metal with high thermal conductivity, such as copper or brass, for transferring heat from the heating elements 150 through the blocks 142 and heating members 140, to the electrical components 14 of the carrier strip 12. The electrical heaters 150 and the thermocouples 151 on each block 142 can be electrically connected to the controller 58. The controller 58 can control the temperature of each individual heating member 140 and/or block 142 by sensing temperature with an associated thermocouple 151 and turning the respective heating element 150 on and off at a rate which provides a constant temperature for the block 142 and heating member 140. Each heating member 140 and associated block 142 can be separated from an adjacent heating member 140 and block 142 by an air gap, which can form a level of thermal isolation between adjacent heating members 140 and blocks 142. Periodic contact with the electrical components 14 on the carrier strip 12 can create periodic changes in heat sink effects on each heated member 140 and block 142. In addition, the heating members 140 and blocks 142 on the ends of the row of heating members 140 can lose heat more quickly than the heating members 140 and blocks 142 that are positioned inwardly in the row and sandwiched between adjacent heating members 140 and blocks 142. Consequently, by controlling the temperature of each individual heating member 140 and/or block 142 with its own heating element 150 and thermocouple 151, each heating member 140 can be actively maintained to be at the same or identical constant temperature despite having periodic heat sink changes, and different heating members 140 being located in positions that lose heat more quickly than others. The heating elements 150 in the middle of the row of heating members 140 and blocks 142 can be turned on and off at a different rate than the heating elements 150 at the ends of the row. The use of individual heating members 140 that are individually heated with controlled heat and thermally isolated from each other, can provide each heating member 140 with relatively small and simple heat sink characteristics, which can help each heating member 140 and block 142 to be maintained at a constant identical temperature.

Each heating member 140 and block 142 can be connected or mounted by a mount 152 to its own respective individual linear actuator 154, such as a fluid, gas or air cylinder, for independently moving each heating member 140 vertically up and down in the direction of arrows 141. The mounts 152 can be configured to minimize heat transfer from each block 142 to its associated cylinder 154, and isolate the heat at the block 142. Each mount 152 can have a lateral elongate plate 152a mounted to the cylinder rod of a cylinder 154. A vertical spacer 152b can be mounted to the plate 152a. The vertical spacer 152b can be generally I shaped, having wide top and bottom ends 155a, a long narrow midsection 155b, and two through holes 155c, one at each end at the junction of the portions 155a and 155b. A generally C shaped adapter having a cavity 153a between two legs 153b, can be secured to block 142 and the tips or ends of the legs 153b can be secured to the top end 155a of spacer 152b. The geometry changes and openings 153b and 155c in the mount 152 can minimize heat transfer along the mount 152 to cylinder 154 and if desired, insulative spacers or gaskets can also be positioned between selected components for heat isolation. Each cylinder 154 can have reed or limit switches 83a and 83b that are electrically connected to the controller 58 for notifying the controller 58 whether each cylinder 154 is extended or refracted. The cylinders 154 can be each mounted to a base plate 156 that is mounted to frame 56a. The cylinders 84, 91 and 154, can be controlled and actuated by a fluid, gas or pneumatic system including control valves, as known in the art, which can be connected to and controlled by controller 58.

In use, referring to FIG. 11, two index holes 12c in the prefluxed carrier strip 12 can be engaged by two index pins 90b extending from the carrier strip index mechanism 90 of the indexer 60 upstream of the die device 67. At the same time, the solder ribbon 50 can be gripped or clamped between jaws 92a and 92b of the solder ribbon index mechanism 92 on the downstream side of die device 67. The cylinder 84 of the indexer 60 moves the reciprocating frame 88 in the downstream direction, thereby moving the carrier strip index mechanism 90 and the solder strip index mechanism 92 simultaneously in the direction of arrows 73a, indexing or moving the carrier strip 12 and the solder ribbon 50 simultaneously and into position in the die device 67, where multiple equally spaced apart electrical components 14 on the carrier strip 12 (such as five) can be aligned with corresponding multiple equally spaced apart longitudinally aligned or positioned die cavities 128, punch members 124 and heating members 140 at multiple punch locations 129. The mechanical stop 98 of the indexer 60 is positioned for ensuring a consistent precise stroke length so that the desired location of the longitudinally aligned electrical components 14 (which can be the center) are each aligned with a die cavity 128 and a vertical assembled axis $V_A$ along which axes $V_P$, $V_D$ and $V_H$ coincide. The guide tracks 68 and 138 align the longitudinal axis $L_S$ of the solder ribbon 50 with the longitudinal axis $L_C$ of the carrier strip 12, and with the longitudinal axis $L_P$ of the punch members 124, the longitudinal axis $L_D$ of the die cavities 128, and the longitudinal axis $L_H$ of the heating members 140. The punch members 124 can be positioned within corresponding upper die cavity guide portions 128a of the die cavities 128 in the upper plate 126, with the bottom or end surface 124c of each punch member 124 spaced above the solder ribbon 50. Each punch member 124 can have a vertical punch axis $V_P$ that is aligned with a vertical die cavity axis $V_D$. The solder ribbon 50 extends through guide track 138 and over the lower die cavity portions 128b in lower plate 130. The lower plate 130 can be positioned above and spaced from the carrier strip 12 and the heating members 140 can be positioned with the clamping surface 140a spaced below the carrier strip 12. Each heating member 140 can have a vertical heating member axis $V_H$ that is aligned with the corresponding vertical axes $V_P$ of the punch members 124 and the vertical axes $V_D$ of the die cavities 128, and each electrical component 14 can be aligned between an opposing die cavity 128 and heating member 140. The electrical components 14 can have a first or upper soldering surface 14a with a lateral width, diameter or size that is larger than the lateral width, diameter or size of the opening of the lower die cavity portions 128b of the die cavities 128, and the heating members 140 can have a tip or end with a heated, heating or clamping surface 140a that can have a lateral width, diameter or size that is smaller than the lateral width, diameter or size of the opposite, second or lower surface 14b of the electrical components 14.

Figure 12:
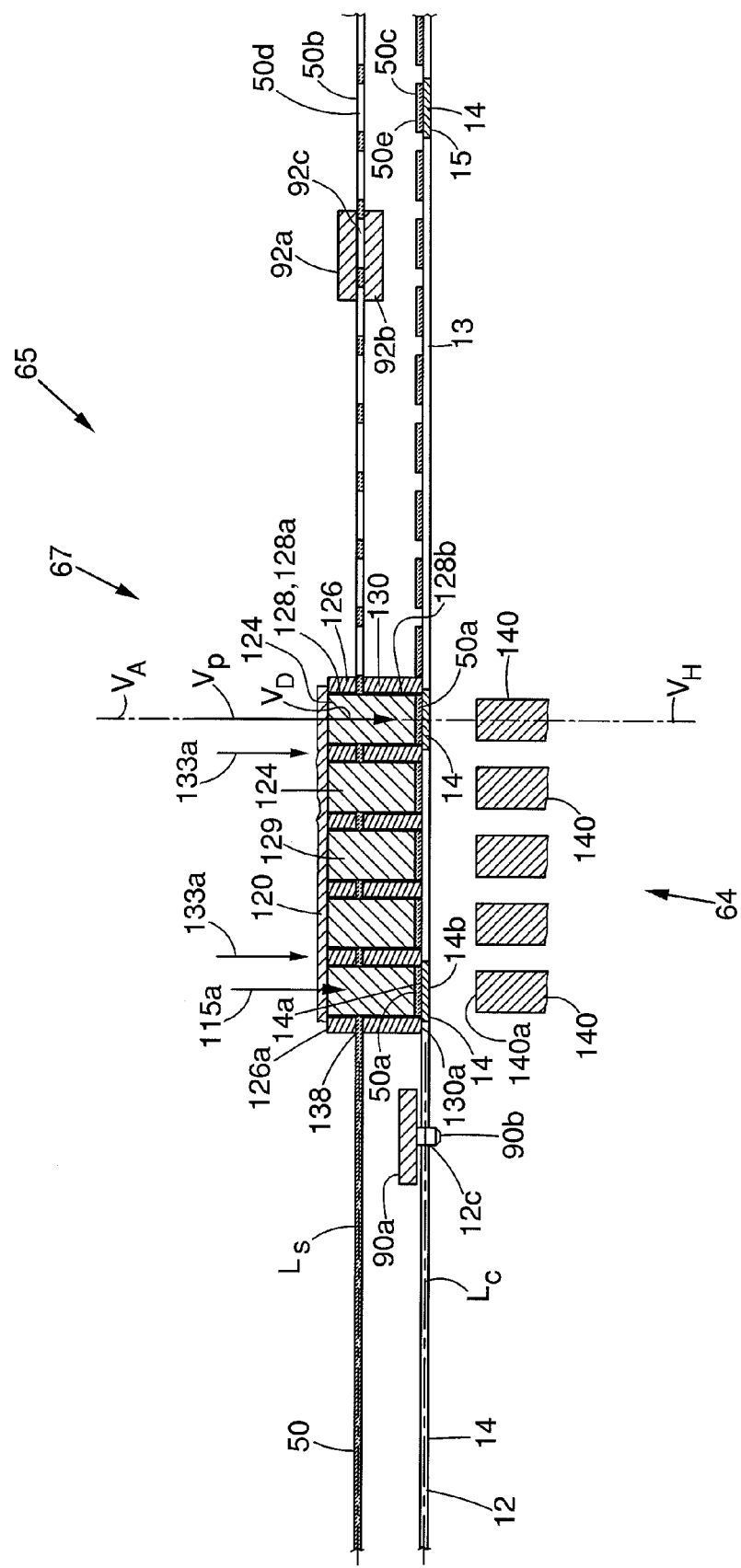
FIG. 12 is a schematic side sectional view of the die device and heating device with the punch members pressing solder preforms downwardly on electrical components with the die device positioned against the electrical components.

Referring to FIG. 12, the punch members 124 can be moved or translated simultaneously vertically downwardly in the direction of arrows 115a through the die cavities 128, by cylinders 110a of linear actuator assembly 110, punching through the solder ribbon 50 to simultaneously punch, form or cut multiple equally spaced apart solder preforms 50a, and pushing or moving the solder preforms 50a downwardly through the lower die cavities 128b, until the solder preforms 50a are pushed against the aligned multiple electrical components 14 on the carrier strip 12. The guide track 68 (FIGS. 3 and 7) can support the carrier strip 12 from the bottom or opposite side so that the preforms 50a can be pressed against the corresponding aligned electrical components 14 with some force. The spacer plate 120 can engage the upper or top surface 126a of the upper die guide plate 126, providing a mechanical stop for the punch members 124 so that the punch members 124 consistently extend within the die cavities 128 by a predetermined distance H (FIG. 8), to a location partway within the die cavities 128, near the bottom of the lower die plate 130. Downward force from the punch members 124 and/or spacer plate 120 on surface 126a of the die plate 126, can be transferred to the die plates 126 and 130, moving or translating the die plates 126 and 130 downwardly in the direction of the arrows 133a so that the bottom die plate 130 and/or the solder preforms 50a engage the carrier strip 12 and/or the top surface 14a of the electrical components 14. Cutting the solder preforms 50a from the solder ribbon 50 forms holes, openings, apertures or cavities 50d to form an appertured scrap solder ribbon portion 50b of solder ribbon 50.

Figure 13:
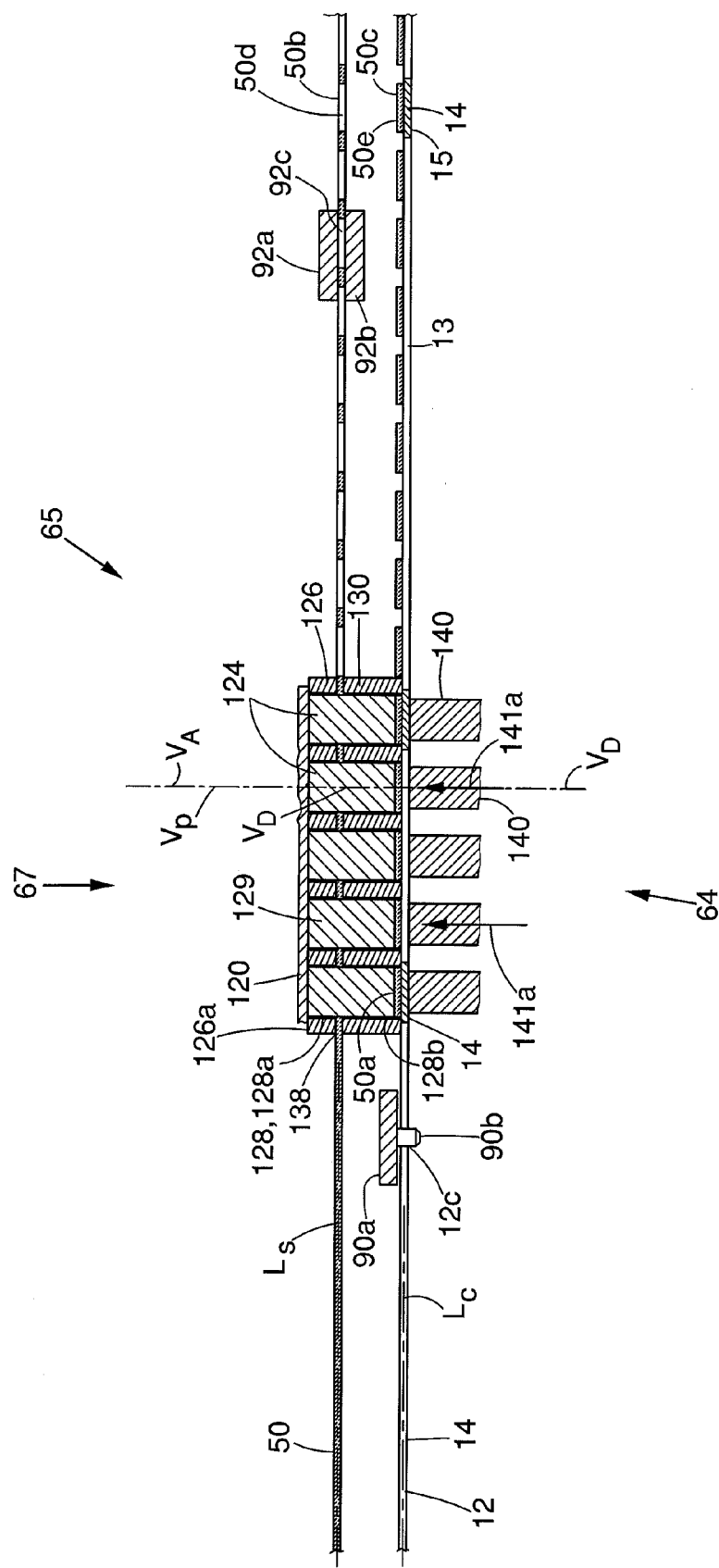
FIG. 13 is a schematic side sectional view of the die device and heating device with the heating members of the heating device pressing upwardly against the electrical components.
Figure 14:
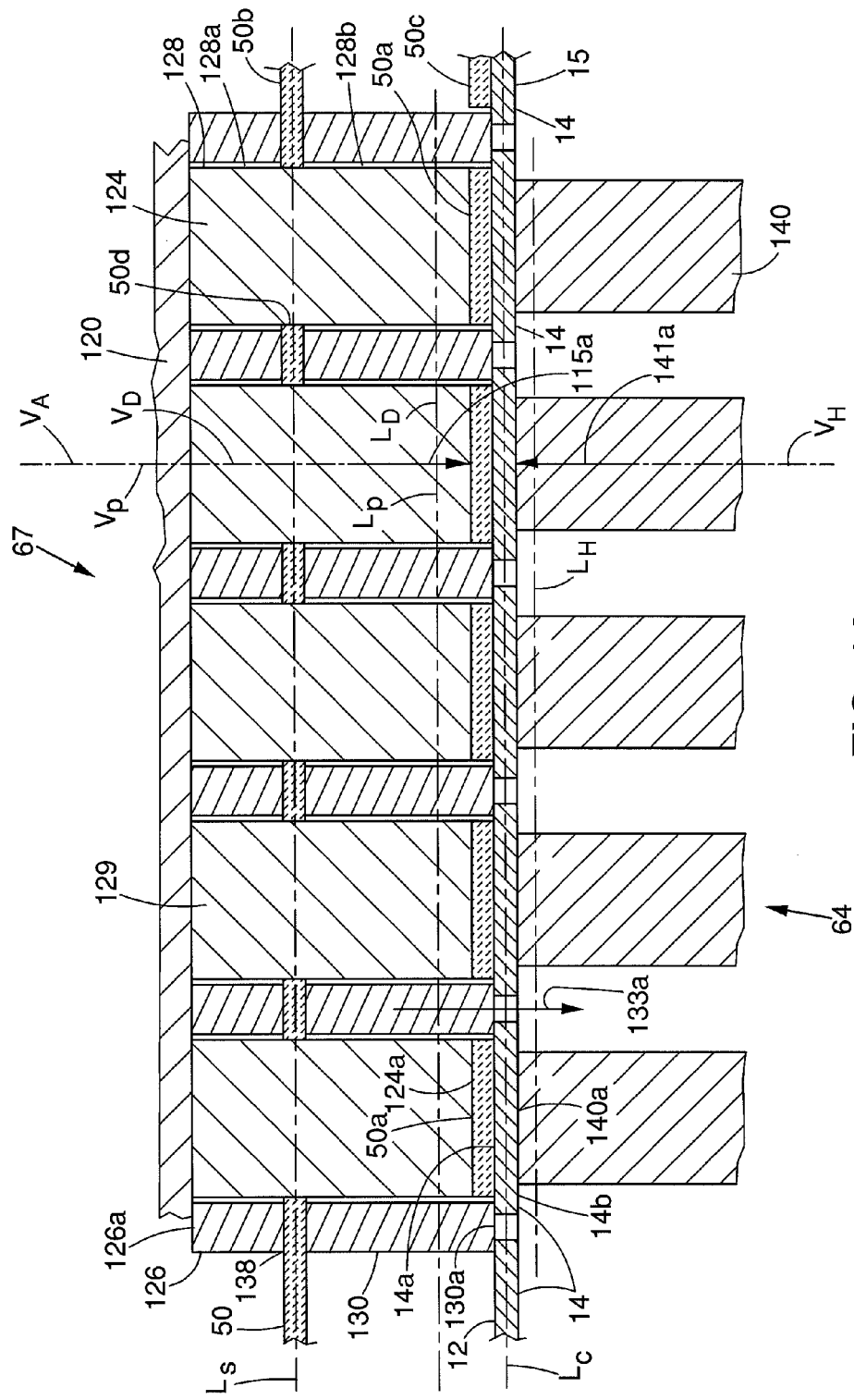
FIG. 14 is an enlarged view of the die device and heating device seen in FIG. 13.

Referring to FIGS. 13 and 14, the heating members 140 can be moved or translated vertically upwardly through holes 108 in track 68 (FIGS. 3 and 7) in the direction of arrows 141a to press the clamping surfaces 140a of the heating members 140 against the corresponding electrical components 14 on the bottom, underside or lower surface 14b, or from the opposite side of the punch members 124. As a result, each electrical component 14 aligned with a respective punch location 129 in soldering device 65 is sandwiched, pressed or clamped under pressure between a punch member 124 and the clamping surface 140a of a heating member 140 of heating device 64, with an electrical preform 50a being clamped, pressed or sandwiched against the top surface 14a of the electrical component 14 by the end surface 124a of the punch member 124. The electrical components 14 of the carrier strip 12 are typically formed by stamping, and are rolled up onto a spool 20. As a result, when the carrier strip 12 is unrolled and indexed into the soldering device 65, the electrical components 14 can be at slightly different elevational levels or can be slightly tilted relative to each other due to deformation of the edge strips 12a and/or connecting members 12b of the carrier strip 12. Since each heating member 140 can be independently actuated by its own individual actuator or cylinder 154, this can compensate for such positional variations of the adjacent electrical components 14, and the clamping surface 140a of each heating member 140 can be in closer or tighter contact with the electrical component 14, minimizing air gaps, thereby maximizing thermal contact and heat flow or transfer from the heating members 140 to the electrical components 14. In addition, the stamping process can cause burrs, deformation or bending such as on the edges of the electrical components 14. By having a clamping surface 140a that is smaller than the width of the electrical components 14, the clamping surfaces 140a can contact the bottom surface 14b radially inward, inside of or away from such burrs or bends, to also provide closer or tighter contact with surface 14b of the electrical components 14, and minimize air gaps between the heating members 140 and the electrical components 14. If air gaps between all the heating members 140 and the corresponding electrical components 14 are not minimized, then some of the punch locations 129 might not experience sufficient heat flow to the electrical components 14, resulting in some defective finished components 15.

Figure 15:
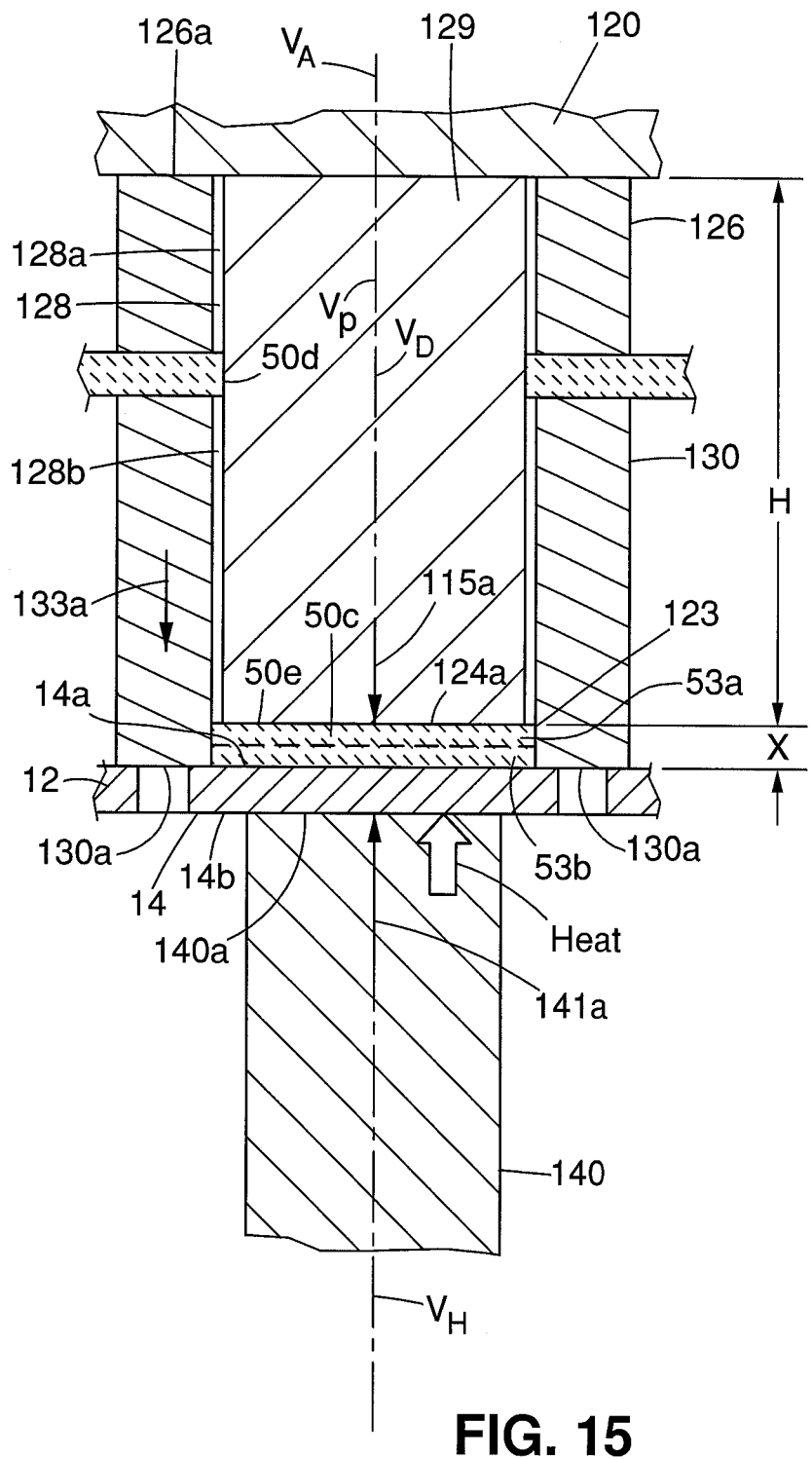
FIG. 15 is an enlarged side schematic view of a layer of solder being molded on an electrical component at a punch location.

FIG. 15 depicts a single punch location 129. In each punch location 129, the heat from the heating member 140 flows from clamping surface 140a into the electrical component 14 through surface 14b, and since the solder preform 50a is pressed tightly against the electrical component 14, heat from the electrical component 14 can flow through surface 14a to the solder preform 50a and melt at least the bottom or a bottom layer 53b of the solder preform 50a to be soldered or secured to the top prefluxed soldering surface 14a of the electrical component 14. The top layer 53a of the solder preform 50a can remain unmelted and flat, and thus form a solder layer 50c on the electrical component 14 with a flat nonmeniscus outer soldering surface 50e which allows the processed or finished carrier strip 13 to be easily processed in subsequent operations, and the electrical component 14 to be more easily soldered to a surface, than if the solder layer 50c had a meniscus or curved outer surface, which typically forms when a quantity of molten solder is solidified onto a surface. The thickness of the solder layer 50c can be precisely controlled by the spacer plate 120. The spacer plate 120 can control the depth or distance H that the punch member 124 extends into the die cavity 128. The bottom of the lower die plate 130 can have a sealing surface 130a for contacting, engaging, clamping or pressing against the upper surface 14a of electrical component 14, often along a perimeter near the outer edges to form a seal therebetween. As a result, there is a consistent controlled gap having a predetermined height X between the bottom or the end surface 124a of the punch member 124 and the sealing surface 130a and the mating upper surface 14a of the electrical component 14. This can form a movable mold 123 with a mold cavity pressed against and sealed over the upper surface 14a of the electrical component 14, formed or defined by the flat end surface 124a of the punch member 124, and the side wall or walls of the lower die cavity portion 128b extending the distance X from the sealing surface 130a or bottom of the lower die plate 130 to the end surface 124a. As the solder preform 50a melts, the sealing surface 130a of the mold 123 against the electrical component 14 can prevent molten solder from escaping the mold 123. In some situations, the whole solder preform 50a can melt, and due to the flat end surface 124a of the punch member 124 contacting the molten solder, the solder layer 50c can still be formed or molded with a flat nonmeniscus outer surface 50e. The solder preform 50a can be formed to be the same thickness, or slightly thicker than the height X of mold 123, for example by about 0.001 up to 0.003 inches. The punch member 124 can press or compress the solder preform 50a against the electrical component 14 with a high enough force to minimize air gaps for optimum thermal or heat transfer. Air gaps between either the punch member 124, solder preform 50a, electrical component 14 or heating member 140 over 0.001 inches, can result in poor heat transfer and inconsistent melting or presoldering. In one embodiment, the distance X can be 0.015 inches and the solder preform 50a can be initially 0.015, or in some embodiments, 0.016 to 0.018 inches thick. During melting, for preforms 50a thicker than X of 0.015 inches, the mold 123 can be configured or operated so that some solder can be allowed to expand slightly outwardly, or escape, so that the solder layer 50c ends up having a thickness of 0.015 inches, the same as distance X. The outer perimeter of the solder layer 50c can take on the shape of the perimeter of the inner die cavity 128b. In the embodiment shown, the solder layer 50c can be disc shaped, with a flat nonmeniscus outer soldering surface 50e and a round perimeter which corresponds to the size, thickness and shape of mold 123. In other embodiments, the outer perimeter of the solder layer 50c can have other suitable shapes, such as one or more polygonal or curved shapes, or combinations thereof. The volume of solder in the solder layer 50c can be consistently controlled by having uniformly sized preforms 50a and molds 123, thereby being suitable for mechanized solder processing by the end user.

Figure 16:
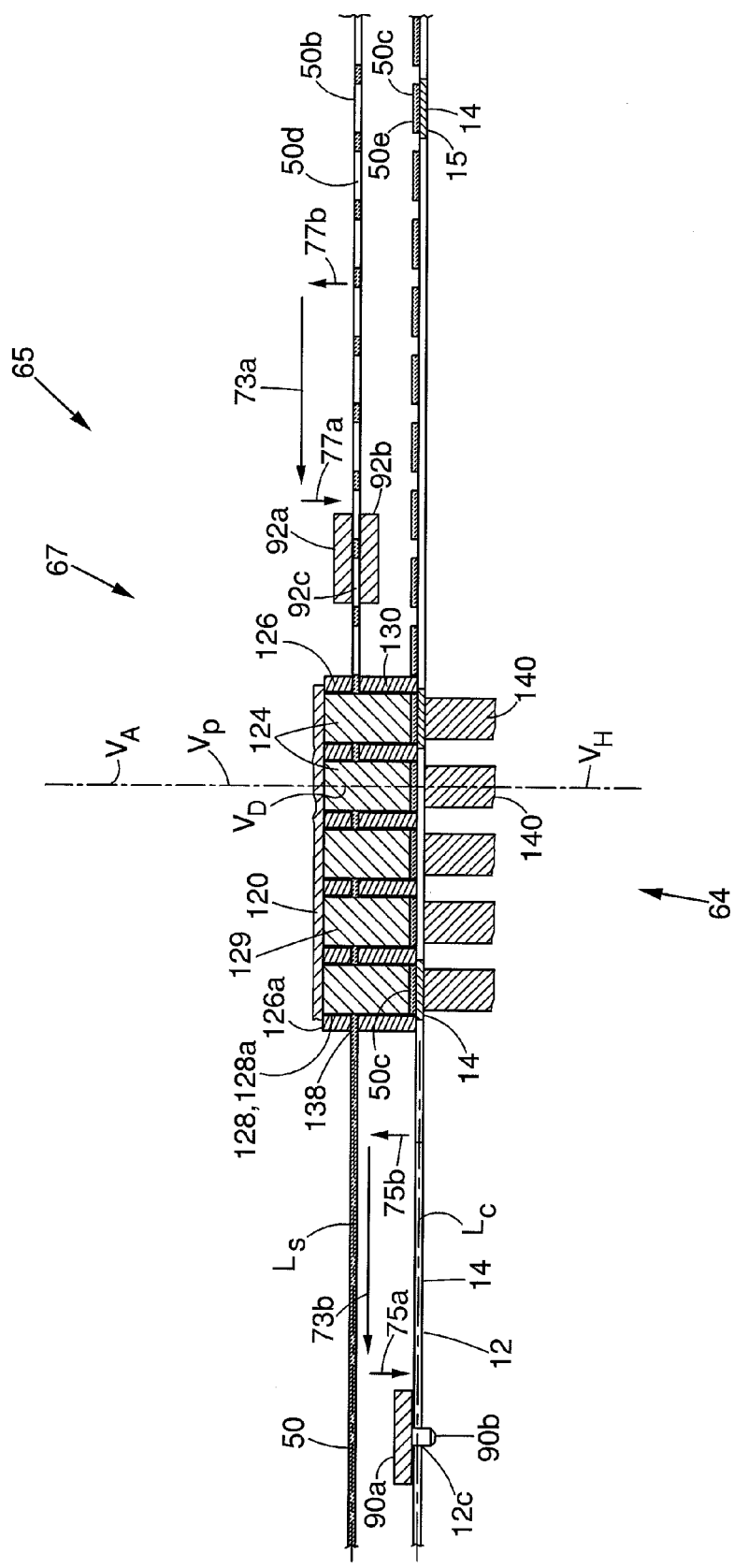
FIG. 16 is a schematic side sectional view of the die device and the heating device with the index mechanisms repositioned for indexing the carrier strip.

Referring to FIG. 16, the cylinders 91 of the indexer 60 can simultaneously move index pins 90b of carrier strip index mechanism 90 upwardly in the direction of arrow 75b for disengaging from index holes 12c while jaw 92a of solder ribbon index mechanism 92 is moved upwardly in the direction of arrows 77b for releasing the scrap solder ribbon portion 50b of the solder ribbon 50. The indexer mechanisms 90 and 92 can then be simultaneously moved by cylinder 84 longitudinally upstream in the direction of the arrows 73b, for example, a distance equal to a selected number of multiple electrical components 14 (such as five) on the carrier strip 12, and then the cylinders 91 can move index pins 90b downwardly in the direction of arrow 75a and jaw 92a downwardly in the direction of arrow 77a simultaneously. This causes the index pins 90b to re-engage a new set of index holes 12c in carrier strip 12, and for the jaws 92a and 92b to again clamp and grip the scrap solder ribbon 50b portion of solder ribbon 50, thereby being repositioned for indexing the carrier strip 12 and solder ribbon 50 forward or downstream again.

Figure 17:
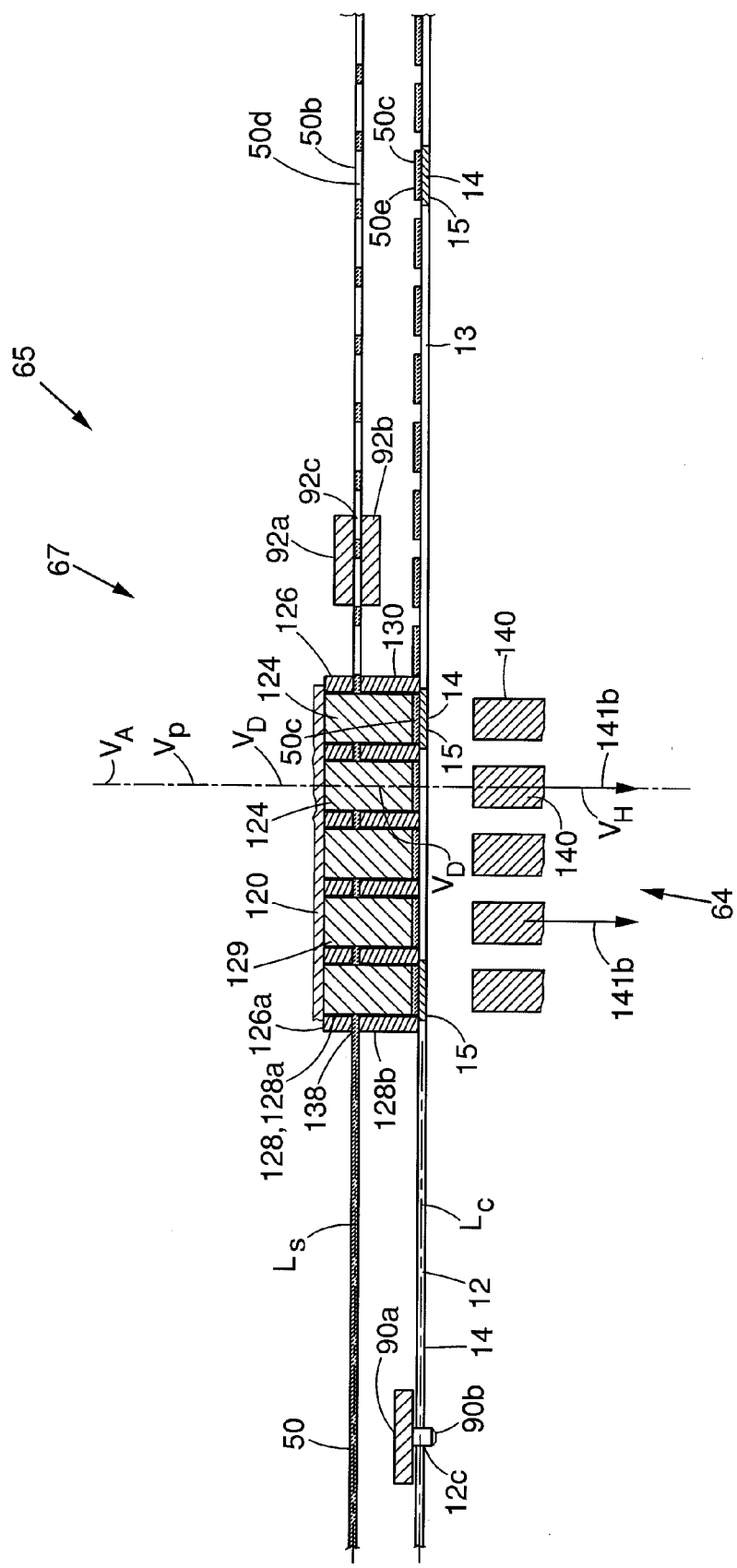
FIG. 17 is a schematic side sectional view of the die device and the heating device with the heating members moving downwardly from the electrical components.

Referring to FIG. 17, the heating members 140 can each be disengaged from the electrical components 14 by respective cylinders 154, moving or translating away downwardly in the direction of the arrows 141b. This allows the solder layers 50c to cool and solidify on the electrical components 14 while contained in molds 123. In some embodiments, the heating members 140 can be heated to a temperature of about 325° F.-350° F. and applied to or pressed against the electrical components 14 for about 1-4 seconds, and then cooled for about 2-5 seconds. These temperatures and times can vary depending upon the melting temperature of the solder composition, the amount of thickness of the solder, and the configuration and/or thickness of the electrical component 14.

Figure 18:
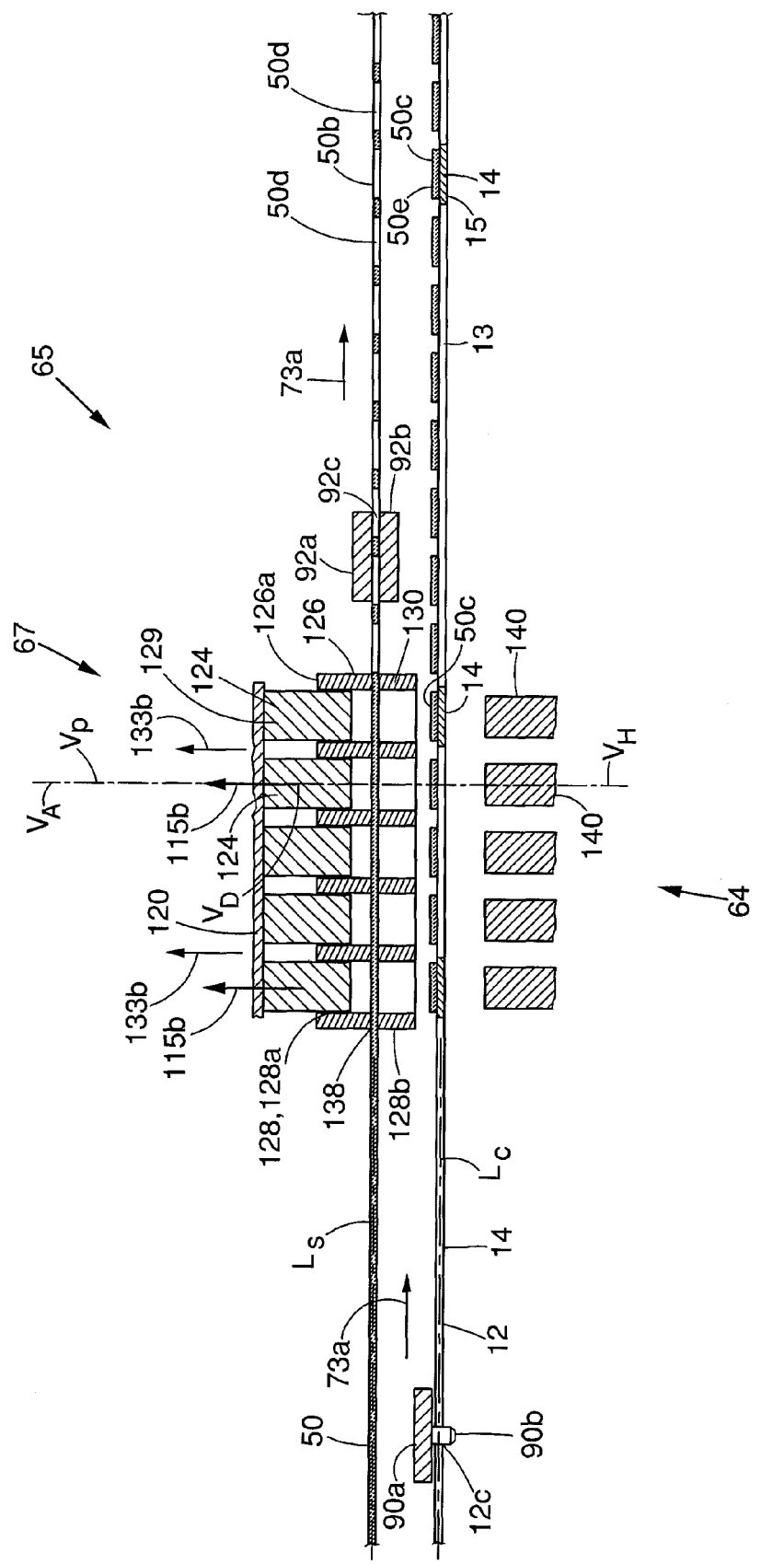
FIG. 18 is a schematic side sectional view of the die device and the heating device with the punch members and the die device moving upwardly away from the electrical components.

Referring to FIG. 18, the punch members 124 and the die plates 126 and 130 are moved or translated upwardly by cylinders 110a in the direction of arrows 115b and 133b away from the finished electrical components 15 at punch locations 129 after the solder layers 50c have solidified. The die cavities 128 and the punch members 124 can have nonstick surfaces, such as a polytetrafluoroethylene (PTFE) coating, to form nonstick coated molds 123 that can be easily simultaneously removed from the solder layers 50c after solidification. The indexer 60 then can index the carrier strip 12 and the solder ribbon 50 forward in the direction of arrows 73a, for aligning and applying solder to a new set of multiple electrical components 14.

By having longitudinally positioned multiple punch locations 129 with multiple punch members 124 extending within multiple die cavities 128, multiple solder preforms 50a can be simultaneously punched from the ribbon of solder 50 and then pressed against multiple electrical components for heating and soldering by multiple heating members 140 at the same time. Five punch locations 129 for simultaneously presoldering five electrical components 14 at the same time, as shown in the drawings, can provide a relatively high rate of processing speed. It is understood that in other embodiments, less than five punch locations, such as 1-4, or more than five punch locations for example, up to 10 or 20, can be used depending upon the situation. Although the punch members 124 have been shown to be above the carrier strip 12 and the heating members 140 vertically below, in some embodiments, the positions can be reversed, or can be aligned horizontally or laterally. In some embodiments, the solder preforms 50a can be previously formed and fed to press members 124 or molds 123. In other embodiments, molten solder, or solder paste can be introduced into molds 123 for forming solder layers 50c. In some embodiments, the heating members 140 can be moved in unison by an actuator but each heating member 140 can be spring loaded by a compressive spring or pneumatic device for compensating for variations in the electrical components 14. Alternatively, the punch members 124 can each have its own sealing surface and a individual actuator or cylinder for independently moving each punch member 124 and its respective sealing surface, instead of providing the heating members 140 with independent compliance. In one embodiment, the carrier strip 12 can be made of copper about 0.01 inches thick, and about ¾ inches wide.

The electrical components 14 can be generally round, or oval, and can be about 0.3 inches to 0.43 inches across. The solder ribbon 50 can be about 0.015 inches thick, and about ⅝ inches wide. The solder preforms 50a can be round and have a diameter of about 0.27 inches. The size and shape of the punch members 124 and heating members 140 can correspond or correlate to the size and/or shape of the solder preforms 50a and electrical components 14. In addition, each punch station 129 in some embodiments can be spaced about ⅝ inches apart. The solder ribbon 50 can be formed of any suitable solder, and in one embodiment, can be a nonlead solder, such as 65 In, 30 Sn, 4.5 Ag, 0.5 Cu, with a melting temperature of about 250° F. It is understood that these dimensions and configurations can vary, depending upon the shape, size and type of electrical components 14 being formed.

Referring back to FIG. 1, the processed carrier strip 13 can exit the downstream end of the soldering station 56 from track 68, and can be wound up onto a roll or spool 74 downstream from soldering station 56 at wind up station 80. The spool 74 can be rotatably mounted to a stand 71 about a horizontal axis 78. A wind up motor 76 can be rotatably coupled to spool 74 for driving spool 74. Motor 76 can be electrically connected to and controlled by controller 58. The scrap portion 50b of solder ribbon 50 can exit solder station 56 from a guide 57 and can fall downwardly into a collection container or bin 72. Alternatively, the scrap portion 50b can be wound up on a roll or spool.

While this invention has been particularly shown and described with references to example embodiments thereof, it will be understood by those skilled in the art that various changes in form and details may be made therein without departing from the scope of the invention encompassed by the appended claims. For example, various features shown and described can be omitted, or oriented, shaped or sized according to the situation at hand or the electrical component 14 to be processed.

What is claimed is:

1. An apparatus for presoldering electrical components comprising:
    a die device comprising longitudinally positioned multiple punch locations having multiple punch members extendable within multiple respective cavities in a die member over which a ribbon of solder is extendable, through which the punch members are capable of entering and extending within for punching multiple solder preforms from the ribbon of solder and pressing the multiple solder preforms against respective multiple electrical components; and
    a heating device, the die device and the heating device capable of moving towards each other for pressing against the electrical components on opposite sides and sandwiching the electrical components for heating the electrical components and melting the solder preforms thereon, each punch member being controllably extendable to a location partway within a respective cavity of the die member to provide a consistent controlled gap with a predetermined distance between an end surface of the punch member and a sealing surface of the die member, for forming a respective mold with a mold cavity defined by the end surface of the punch member and a side wall of the cavity that extends the distance from the sealing surface of the die member to the end surface of the punch member, the sealing surface of the mold for positioning against a respective electrical component for preventing molten solder from escaping, each mold cavity being shaped and sized for forming a solder layer on a respective electrical component having a predetermined thickness and a flat nonmeniscus outer surface, and removable after solder solidification, the heating device comprising longitudinally positioned multiple spaced apart heating members movable relative to respective punch members for pressing against respective multiple electrical components and sandwiching the multiple electrical components for simultaneously heating the electrical components and melting the solder preforms thereon, the heating members are each connected to a respective actuator for independent movement of each heating member, the respective actuators capable of individually simultaneously pressing the heating members against the respective electrical components.

2. The apparatus of claim 1 in which a series of electrical components are attached to a carrier strip in spaced apart fashion, and positioned longitudinally.

3. The apparatus of claim 1 in which each heating member includes a heating element for individually heating the heating member, and a clamping surface sized for pressing only against a respective electrical component.

4. The apparatus of claim 3 in which each heating member provides heat for melting a bottom layer of a respective solder preform for soldering to a respective electrical component.

5. The apparatus of claim 1 in which the punch members and cavities within the die members are formed with a nonstick surface.

6. The apparatus of claim 2 in which the ribbon of solder and the carrier strip having the series of electrical components are indexed together in unison, with the ribbon of solder being positioned above the carrier strip.

7. The apparatus of claim 6 further comprising a reciprocating indexer for simultaneously indexing the ribbon of solder and the carrier strip together, the indexer having a clamping device for clamping the solder ribbon and indexing pins for engaging mating holes in the carrier strip.

* * * * *